United States Patent
Banerjee et al.

(10) Patent No.: US 10,528,542 B2
(45) Date of Patent: Jan. 7, 2020

(54) CHANGE DIRECTION BASED MAP INTERFACE UPDATING SYSTEM

(71) Applicant: Google Inc., Mountain View, CA (US)

(72) Inventors: Sujoy Banerjee, San Francisco, CA (US); Yan Mayster, Aurora, CO (US); Brian Edmond Brewington, Superior, CO (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/560,697

(22) PCT Filed: Aug. 24, 2016

(86) PCT No.: PCT/US2016/048411
§ 371 (c)(1),
(2) Date: Sep. 22, 2017

(87) PCT Pub. No.: WO2018/038722
PCT Pub. Date: Mar. 1, 2018

(65) Prior Publication Data
US 2018/0253424 A1  Sep. 6, 2018

(51) Int. Cl.
*G06F 16/00* (2019.01)
*G06F 16/23* (2019.01)
(Continued)

(52) U.S. Cl.
CPC .............. *G06F 16/23* (2019.01); *G06F 16/29* (2019.01); *G06F 16/583* (2019.01); *G06K 9/4642* (2013.01); *G06T 1/0007* (2013.01); *G06T 7/0002* (2013.01); *H04W 4/02* (2013.01)

(58) Field of Classification Search
USPC ......................................................... 382/113
See application file for complete search history.

(56) References Cited

U.S. PATENT DOCUMENTS

| 4,912,770 A | 3/1990 | Seto et al. |
| 4,984,279 A | 1/1991 | Kidney et al. |

(Continued)

FOREIGN PATENT DOCUMENTS

| CN | 104778719 | 7/2015 |
| EP | 2077542 | 7/2009 |

(Continued)

OTHER PUBLICATIONS

PCT International Search Report for PCT/US2016/048391, dated Jun. 1, 2017—13 pages.

(Continued)

*Primary Examiner* — Jerome Grant, II
(74) *Attorney, Agent, or Firm* — Dority & Manning PA

(57) ABSTRACT

Systems and methods for updating a map interface are provided. In one embodiment, a method includes obtaining data descriptive of a map tile of a map interface that is displayable on a display device. The map tile presents imagery associated with at least a portion of a geographic area. The method includes obtaining data descriptive of an image depicting at least the portion of the geographic area. The image is acquired by an image acquisition system. The method includes analyzing the data descriptive of the map tile and the data descriptive of the image to determine an occurrence of a change associated with the geographic area. The method includes updating the map interface to reflect the change associated with the geographic area based at least in part on the occurrence of the change associated with the geographic area.

19 Claims, 10 Drawing Sheets

(51) Int. Cl.

| | | |
|---|---|---|
| *G06F 16/29* | (2019.01) | |
| *G06F 16/583* | (2019.01) | |
| *G06K 9/46* | (2006.01) | |
| *G06T 1/00* | (2006.01) | |
| *G06T 7/00* | (2017.01) | |
| *H04W 4/02* | (2018.01) | |

(56) References Cited

U.S. PATENT DOCUMENTS

| | | | |
|---|---|---|---|
| 6,335,976 B1 | 1/2002 | Belmares | |
| 6,661,838 B2 | 12/2003 | Koga et al. | |
| 7,270,299 B1 | 9/2007 | Murphy | |
| 7,578,938 B2 | 5/2009 | Garceau et al. | |
| 7,650,047 B2 | 1/2010 | Jin et al. | |
| 7,990,804 B2 | 8/2011 | Gendron et al. | |
| 8,144,937 B2 | 3/2012 | Zimmer et al. | |
| 8,243,551 B2 | 8/2012 | Gendron et al. | |
| 8,379,913 B1 | 2/2013 | Robinson et al. | |
| 8,348,248 B2 | 10/2013 | Mitchell et al. | |
| 9,886,771 B1 | 2/2018 | Chen et al. | |
| 2008/0278508 A1 | 11/2008 | Anderson et al. | |
| 2010/0098342 A1 | 4/2010 | Davis et al. | |
| 2012/0163662 A1* | 6/2012 | Lee | G05D 1/0278 382/103 |
| 2013/0287307 A1 | 10/2013 | Omer et al. | |
| 2014/0064554 A1 | 3/2014 | Coulter et al. | |
| 2015/0003710 A1 | 1/2015 | Masumoto et al. | |
| 2015/0371389 A1 | 12/2015 | Siegel et al. | |
| 2017/0081628 A1* | 3/2017 | Matsubara | G06T 7/0012 |
| 2017/0100661 A1* | 4/2017 | Slav | A63F 13/213 |
| 2017/0309171 A1 | 10/2017 | Zhao et al. | |
| 2018/0253621 A1* | 9/2018 | Banerjee | G06F 17/30241 |
| 2018/0293439 A1* | 10/2018 | Slesarev | G06K 9/00637 |
| 2018/0322606 A1* | 11/2018 | Das | G06T 1/20 |
| 2018/0374234 A1* | 12/2018 | Bronkalla | G06T 7/73 |

FOREIGN PATENT DOCUMENTS

| | | |
|---|---|---|
| WO | WO2010/105935 | 9/2010 |
| WO | WO2012/017187 | 2/2012 |

OTHER PUBLICATIONS

PCT International Search Report for PCT/US2016/048411, dated Mar. 20, 2017—13 pages.

Boriah, "Time Series Change Detection: Algorithms for Land Cover Change," Dissertation Submitted to University of Minnesota, Apr. 2010—160 pages.

Calandrelli, "Astro Digital Releases Platform for Anyone to Analyze Satellite Imagery", posted Feb. 24, 2016, https://techcrunch.com/2016/02/24/astro-digital-releases-platform-for-anyone-to-analyze-satellite-imagery/—9 pages.

Carbone et al. "Automatic Generation of Frequently Updated Land Cover Products at National Level Using COSMO-SkyMed SAR Imagery," 2016 IEEE International Geoscience and Remote Sensing Symposium, Beijing, China, Jul. 10-15, 2016, pp. 3406-1409.

Coulter, "Detailed Change Detection Using High Spatial Resolution Frame Center Matched Aerial Photography," 20th Biennial Workshop on Aerial Photography, Videography, and High Resolution Digital Imagery for Resource Assessment, Oct. 4-6, 2005, Weslaco, Texas—12 pages.

Coulter et al., "Near Real-Time Change Detection for Border Monitoring," The American Society for Photogrammetry and Remote Sensing Annual Conference, Milwaukee, Wisconsin, May 1-5, 2011—9 pages.

Crawford, "Leveraging Geospatial Big Data with Artificial Intelligence," Case Study, www.digitalglobe.com/geobigdata—11 pages.

De Jonge et al. "Time Patterns, Geospatial Clustering and Mobility Statistics Based on Mobile Phone Network Data," Chapter 12, Discussion Paper, Statistics Netherlands, The Hague/Heerlen, 2012—26 pages.

DigitalGlobe, "Machine Learning Meets Geospatial Big Data," May 31, 2016—5 pages.

Hussain et al. "Change Detection from Remotely Sensed Images: From Pixel-Based to Object-Based Approaches." ISPRS Journal of Photogrammetry and Remote Sensing 80, 2013, pp. 91-106.

Kim, "Satellite Mapping and Automated Feature Extraction: Geographic Information System-Based Change Detection of the Antarctic Coast," Dissertation Submitted to Ohio State University, 2004—171 pages.

Olanoff, "Satellite Imagery Company Skybox Teams up with Mapbox for Analysis and Annotation of Data," posted Apr. 24, 2013, https://techcrunch.com/2013/04/24/satellite-imagery-company-skybox-teams-with-mapbox-for-analysis-and-annotation-of-data/, accessed on Jun. 28, 2016—6 pages.

Troglio et al., "Unsupervised Change-Detection in Retinal Images by a Multiple-Classifier Approach," International Workshop on Multiple Classifier Systems, Cairo, Egypt, Apr. 7-9, 2010, pp. 94-103.

Written Opinion of the International Preliminary Examining Authority for PCT/US2016/048391 dated Jul. 12, 2018, 8 pages.

* cited by examiner

CHANGE DIRECTION BASED MAP INTERFACE UPDATING SYSTEM

FIELD

The present disclosure relates generally to updating a map user interface, and more particularly to updating a map interface based, at least in part, on machine-learned change detection of a geographic area.

BACKGROUND

Images of geographic locations can be used for a variety of purposes, such as geographic user interfaces, navigation systems, online search responses, etc. These images can be acquired, for example, by satellites programmed to capture imagery of particular geographic locations. In some cases, the frequency of image capture associated with a particular location can depend on online user impressions. For example, the more often users search for a particular location and/or view the location within a user interface, the more frequent a system of satellites may acquire images of the location. This approach may not, however, accurately capture which areas are undergoing the greatest amount of change.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of updating a map interface. The method includes obtaining, by one or more computing devices, data descriptive of a map tile of a map interface that is displayable on a display device. The map tile presents imagery associated with at least a portion of a geographic area. The method includes obtaining, by the one or more computing devices, data descriptive of an image depicting at least the portion of the geographic area. The image is acquired by an image acquisition system. The method includes analyzing, by the one or more computing devices, the data descriptive of the map tile and the data descriptive of the image to determine an occurrence of a change associated with the geographic area. The method includes updating, by the one or more computing devices, the map interface to reflect the change associated with the geographic area based at least in part on the occurrence of the change associated with the geographic area.

Another example aspect of the present disclosure is directed to a computer system for updating a map interface including at least one processor and at least one tangible, non-transitory computer-readable medium that stores instructions that, when executed by the at least one processor, cause the computing system to obtain data descriptive of a map tile of a map interface that is displayable on a display device. The map tile presents imagery associated with at least a portion of a geographic area. The instructions cause the computing system to obtain data descriptive of an image depicting at least the portion of the geographic area. The instructions cause the computing system to analyze the data descriptive of the map tile and the data descriptive of the image to determine an occurrence of a change associated with the geographic area. The instructions cause the computing system to update the map interface to reflect the change associated with the geographic area based at least in part on the occurrence of the change associated with the geographic area.

Other example aspects of the present disclosure are directed to systems, apparatuses, tangible, non-transitory computer-readable media, user interfaces, memory devices, and electronic devices for updating a map interface.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
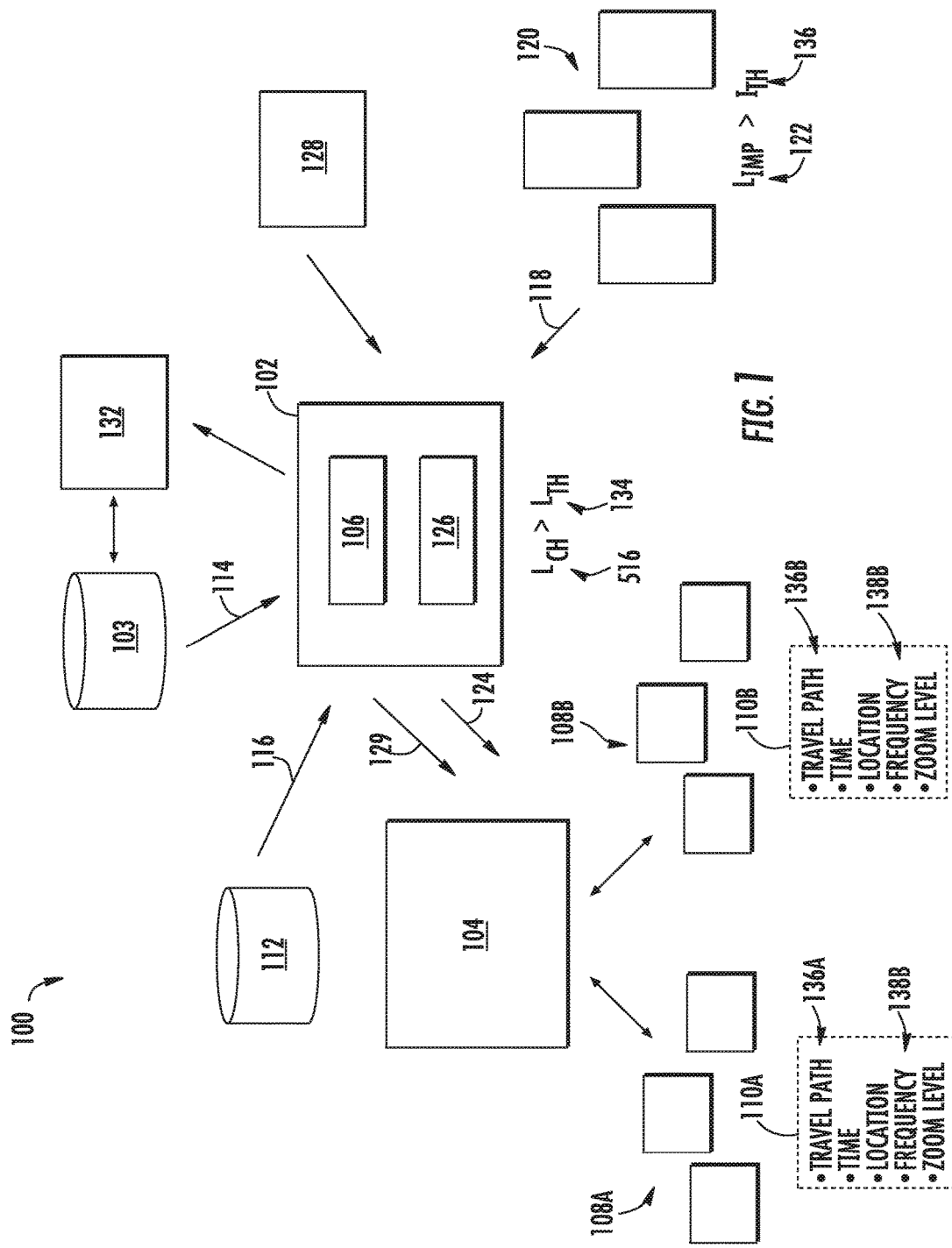
FIG. 1 depicts an example system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to updating a map interface based, at least in part, on the detection of change within a geographic area. The map interface can be a navigable map interface, such as that presented by Google Maps, Google Earth, etc. The map interface can be constructed by a plurality of map tiles. Each tile can present imagery associated with a geographic area (e.g., a residential neighborhood). The map tiles can be displayed on a display device such that a user can view and interact with the map interface. A computing system with one or more machine-learned models can obtain a particular map tile of the map interface (e.g., from a map tile database). The computing system can also obtain an image depicting the neighborhood shown in the particular map tile (e.g., from an image database). The image can be, for instance, one that has been recently captured by an image-capturing platform (e.g., automobile, aircraft, satellite) of an image acquisition system. The computing system can analyze the map tile and the image to determine an occurrence of a change within the neighborhood depicted in the particular map tile and the corresponding image. In particular, in one example, the computing system can use a machine-learned binary classifier model to evaluate the map tile and the image to identify a change in buildings, roads, etc. within various sub-regions (e.g., land plots) within the neighborhood. The computing system can determine an overall level of change for the geographic area based, at least in part, on the changes that have occurred in the sub-regions. In the event that change has occurred (e.g., above a threshold level), the computing system can update the map interface to reflect the change associated with the neighborhood. Moreover, if the neighborhood is experiencing a high level of change, the computing system can also task the image acquisition system to more frequently acquire images associated with the neighborhood, such that the system can monitor and detect future changes in the neighborhood. In this way, the computing system can use the detection of change within a geographic area to more efficiently refresh the map tiles of a map interface, increasing the accuracy of the map interface.

An example system according to aspects of the present disclosure can include a map database, an image acquisition system, and a machine learning computing system. The map database can store a plurality of map tiles that can be used to render a map interface. Each of the map tiles can present imagery associated with, at least a portion of, a geographic area. The geographic area can include a region of a celestial object (e.g., Earth, moon, mars, other body), region of a country, a state, a municipality, an area defined by land boundaries, a neighborhood, a subdivision, a school district, a shopping center, an office park, etc.

The image acquisition system can include one or more image-capturing platform(s) configured to acquire images associated with the geographic area. The image-capturing platform(s) can include one or more street-level platform(s) (e.g., automobiles, other ground-based imaging platforms, aerial platforms travelling at a lower altitude to acquire street-level images) and/or aerial platforms (e.g., aircrafts, helicopters, unmanned aerial vehicles (UAVs), balloons, satellites, other overhead imaging platforms). The image-capturing platforms can be configured to acquire images of a geographic area based, at least in part, on an image acquisition pattern (e.g., setting travel path, image acquisition frequency, zoom levels).

In some implementations, images acquired by the image acquisition system can be stored in an accessible image database that stores imagery of geographic areas. The image database can be associated with the image acquisition system itself, the machine learning computing system, and/or another computing system, separate from the machine learning computing system and the image acquisition system. The image database can store various types of image data associated with geographic areas. For instance, the image data can include ground-level images (e.g., street-level panoramic images, sets of light detection and ranging (LIDAR) data, other imagery at or near the level of the ground) as well as overhead images (e.g., images with overhead view). The images can be optical images, infrared images, LIDAR data images, hyperspectral images, or any other type of imagery.

Additionally, and/or alternatively, the images can be user submitted imagery (e.g., photographs). The machine learning computing system can access like images (from the image database) to facilitate the comparison of imagery as described herein (e.g., overhead to overhead images).

The machine learning computing system can be associated with a mapping service provider (e.g., Google Maps, Google Earth). The computing system can evaluate map tile data and imagery data associated with a geographic area. For instance, the computing system can obtain a map tile of a map interface (e.g., from the map database). The map tile can present imagery associated with at least a portion of a geographic area. The map tile can be generated at a first time. The computing system can also obtain an image depicting at least the portion of the geographic area (e.g., from the image database). The image may have been acquired by the image acquisition system (e.g., via the image-capturing platforms, user submission), at a second time that is later than the first time.

In some implementations, the computing system can identify a geographic area of interest based, at least in part, on location data. For instance, the computing system can obtain location data associated with a plurality of user devices (e.g., phones, tablets, other mobile computing devices). The location data can be descriptive of a location associated with the user device. For instance, the location data can include one or more raw location report(s) that include a geocode that identifies a latitude and longitude associated with the user device. This can allow the computing system to determine a level of importance associated with a particular geographic area. By way of example, the location data can indicate that a high number of users have been recently visiting a particular neighborhood (or subdivision within the neighborhood). The high amount of user traffic can be descriptive of a high level of importance (e.g., user interest, potential area of change) associated with the neighborhood. As such, the computing system can identify the neighborhood as a geographic area of interest for which it should determine the occurrence of change.

The computing system can analyze the map tile and the image to determine an occurrence of a change associated with the geographic area. For instance, the computing system can analyze the map tile and image to determine the addition of new buildings and/or roads, ongoing building and/or road construction, the removal of buildings and/or roads, ongoing building and/or road destruction, etc. within a neighborhood of interest. To do so, the computing system can utilize a machine-learned binary classifier model to detect change within the geographic area. The binary classifier model can be a machine-learned model or can otherwise include various machine-learned models such as neural networks (e.g., deep neural networks) or other multi-layer non-linear models.

The binary classifier model can be configured to detect the occurrence of a change within the geographic area by examining the imagery presented in the map tile and the image. For instance, the computing system can split the map tile (e.g., depicting the geographic area) into a first plurality of cells. The computing system can split the image of the geographic area into a second plurality of cells. Each cell can depict a target, sub-region (e.g., land plot) of the larger geographic area (e.g., neighborhood). The computing system can select a first cell from the first plurality of cells and a corresponding second cell from the second plurality of cells. For example, the first cell and the second cell can be associated with the same (or similar) sub-region of the geographic area. The computing system can input data descriptive of the first and second cells into the machine-learned binary classifier model. This data can include the portion of the imagery (e.g., the individual pixels) represented in the individual cell, as well as the visual characteristics associated therewith.

The model can identify an occurrence of a change (e.g., building change, road change) associated with the target, sub-region (e.g., land plot of a neighborhood). For example, the model can be trained to identify the occurrence of the change associated with the target, sub-region by comparing one or more visual characteristic(s) (e.g., pixel color, intensity, depicted objects) of the first and second cells. The model can classify the occurrence of the change in a binary manner such as whether change has occurred between the time the map tile was generated and the image was captured (e.g., "1") or whether change has not occurred (e.g., "0"). The binary classifier model can generate an output descriptive of whether change has occurred within the sub-region represented in the cells. This process can be repeated for other cells of the map tile and image to identify the occurrence of change within multiple sub-regions of the geographic area.

In some implementations, the computing system can determine a level of change associated with the geographic area. The level of change can represent the overall change experienced by the geographic area. The level of change can be based, at least in part, on the changes that have occurred in the sub-regions of the geographic area. For instance, the computing system can determine the level of change associated with the geographic area (e.g., neighborhood) by aggregating the change occurrences determined for each sub-region (e.g., land plots). In some implementations, the overall level of change for a geographic area can be determined by adding the binary classifications (e.g., 0, 1) determined for each sub-region of the geographic area. For example, the geographic area can be divided into 224 cells, each depicting a sub-region. The binary classifier model can determine that 150 of those sub-regions are not experience change (e.g., outputting a "0"), while 74 of the sub-regions are experiencing change (e.g., outputting a "1"). The level of change for the geographic area can, thus, be 74, representing a summation of the binary classifications (e.g., 150 "0's"+74 "1's"). This value can further be normalized (e.g., 74/(74+150)=0.33) to normalize away the size of the cell. As will be further described herein, in some implementations, the computing system can determine the level of change per square distance and/or using weighted approaches.

The computing system can update the map interface to reflect the change associated with the geographic area based, at least in part, on the occurrence of the change associated with the geographic area. For instance, the computing system can instruct a map tile management system to create a new map tile to reflect the change in the geographic area. In some implementations, the computing system can do so when the level of change exceeds a threshold (e.g., descriptive of a significant level of change and/or rate of change). The computing system can replace the analyzed map tile of the map interface with the new map tile that reflects the change in the geographic area.

In some implementations, the computing system can provide a control command to the image acquisition system to adjust an acquisition of imagery data associated with the geographic area based, at least in part, on the level of change. For instance, in the event that the level of change associated with the geographic area is high (e.g., above the threshold), the control command can instruct the image acquisition system to increase the acquisition of imagery data associated with the geographic area. In the event that the level of change is low (or no change has occurred), the computing system can instruct the image acquisition system to maintain the current acquisition approach or decrease the acquisition of imagery data associated with the geographic area. The image acquisition system can receive the control command and, to implement such a change in imagery acquisition, the image acquisition system can adjust an acquisition pattern associated with a street-level platform and/or an aerial platform. For example, the travel pattern (e.g., driving path, flight trajectory) and/or image capture frequency associated with the image-capturing platform can be adjusted such that the platform can capture images associated with the geographic area (e.g., neighborhood) more often. The computing system can compare the newly captured images to map tiles of the map interface to monitor and confirm changes that may occur in the geographic area, and update the map tiles accordingly.

The systems and methods of the present disclosure can help to optimise the updating of maps to reflect changes taking place in the environment. More particularly, embodiments of the present disclosure seek to identify particular areas (represented in map tiles) that are undergoing higher levels of change and to update the map of those areas accordingly. Thus, the rate at which individual map tiles are updated will reflect the amount of change occurring in the areas represented by the tiles. For example, geographic areas that are undergoing a rapid increase in infrastructure, with an accompanying increase in the number of roads and/or buildings can be updated more frequently than those in which there are few changes taking place over time. In this way, embodiments can help to ensure that data processing is restricted to those map tiles in which there are actual changes taking place. In contrast with conventional techniques, therefore, embodiments described herein avoid the need to update the map in a wholesale fashion, and so avoid the need to update regions in which there is little difference between successive images. By doing so, embodiments can help to reduce the computational burden involved in updating the map, by avoiding the need to re-generate map tiles in which no significant changes are being made.

The systems and methods of the present disclosure provide an improvement to map interface computing technology. For instance, the systems can tailor map interface refresh rate by analyzing a map tile and an image to determine an occurrence of a change associated with the geographic area and updating the map interface to reflect the change associated with the geographic area (presented in the map tile) based, at least in part, on the occurrence of the change associated with the geographic area. As such, the computing technology can ensure its resources are being used to refresh the portions of a map interface that are experiencing change, rather than portions that are not. Moreover, this can allow the computing technology to efficiently update a map interface at appropriate times, while increasing the accuracy of the map interface to reflect more current conditions within a depicted geographic area.

Furthermore, tasking an image acquisition system based, at least in part, on change detection according to example aspects of the present disclosure represents a more efficient approach to geographic image acquisition. More particularly, the systems and methods of the present disclosure seek to identify particular regions that are undergoing higher levels of change and to adjust the acquisition of images accordingly. This can allow a computing system to monitor the change occurring in a geographic area and update a map interface accordingly.

Additionally, the use of a machine-learned binary classifier model to determine change on a granular, cellular level can allow for the determination of change using lower resolution images. More particularly, by identifying change on a granular, cellular level of an image in a binary manner (e.g., whether change has or has not occurred), the computing system can use lower-resolution image data without having to determine a type or magnitude of change within the smaller, sub-regions represented in each cell, which would require higher resolution images. Use of lower resolution imaging can lead to lower image acquisition costs (e.g., via use of cheaper, lower resolution platform hardware).

The systems and methods of the present disclosure provide an improvement to imagery acquisition and analysis computer technology. For instance, the systems can tailor image acquisition by analyzing a map tile and an image to determine an occurrence of a change associated with the geographic area and by determining a level of change associated with a geographic area. Moreover, the computing system can detect change using lower resolution imagery by inputting data descriptive of one or more cells into a machine-learned binary classifier model and receiving an output from the binary classifier model. The output can be descriptive of the occurrence of the change associated with a, sub-region (e.g., represented in a cell) of the geographic area. This can allow the computing technology to operate at a lower bandwidth, experience faster data download/upload (e.g., of lower resolution images), and save computational resources (and costs) which can be allocated to other analytical and/or image processing operations.

FIG. 1 depicts an example system 100 according to example embodiments of the present disclosure. The system 100 can include a machine learning computing system 102, a map database 103, and an image acquisition system 104. The computing system 102, the map database 103, and/or the image acquisition system 104 can be configured to communicate and/or transfer data between one another via a direct connection and/or can be coupled via one or more communications network(s).

The computing system 102 can be associated with a mapping service provider such as, Google Maps or Google Earth developed by Google Inc. (Mountain View, Calif.), or other suitable geographic service. The computing system 102 can be configured to provide a navigable map user interface for display on a display device. The computing system 102 can include one or more computing device(s) 106. As will be further described herein, the computing device(s) 106 can include one or more processor(s) and one or more memory device(s). The one or more memory device(s) can store instructions that when executed by the one or more processor(s) cause the one or more processor(s) to perform operations and functions, for example, such as those described herein for analyzing images and updating a map interface.

The map database 103 can store a plurality of map tiles that can be used to render a map interface. Each of the map tiles can present imagery associated with, at least a portion of, a geographic area. The geographic area can include a region of a celestial object (e.g., Earth, moon, mars, other body), region of a country, a state, a municipality, an area defined by land boundaries, a neighborhood, a subdivision, a school district, a shopping center, an office park, body of water, waterway, etc. Depending on the resolution (e.g., whether the map is zoomed in or out), one map tile may cover an entire region (e.g., a state) in relatively little detail. Another map tile may cover just a few streets in high detail. The data stored in the map database 103 is not limited to any particular format. For example, the data may comprise street maps, imagery data captured from image-capturing platforms, and/or a combination of these, and may be stored as vectors (e.g., particularly with respect to street maps) or bitmaps (e.g., particularly with respect to images). The various map tiles are each associated with geographic areas, such that a server is capable of selecting, retrieving and transmitting one or more tile(s) for presentation in the map interface (e.g., in response to receipt of user input directed to a particular geographical area). For example, the computing system 102 can access and obtain the map tiles stored in the map database 103 and render a map interface based, at least in part, on the map tiles. In some implementations, the map database 103 can be included with and/or otherwise associated with the computing system 102.

The image acquisition system 104 can be configured to manage and acquire image data associated with one or more geographic area(s). The image acquisition system 104 can include one or more computing device(s) that include one or more processor(s) and one or more memory device(s). The one or more memory device(s) can store instructions that when executed by the one or more processor(s) cause the one or more processor(s) to perform operations and functions, for example, such as those for acquiring and managing the acquisition of imagery data.

The image acquisition system 104 can include one or more image-capturing platform(s) 108A-B configured to acquire images associated with a geographic area. The image-capturing platform(s) 108A-B can include one or more street-level platform(s) 108A (e.g., automobiles, aerial platforms travelling at a lower altitude to acquire street-level images, fixed structures configured to capture street-level images, other ground-based imaging platforms) and/or aerial platform(s) 108B (e.g., aircrafts, helicopters, unmanned aerial vehicles (UAVs), balloons, satellites, fixed structures configured to capture overhead images, other overhead imaging platforms). The image-capturing platform(s) 108A-B can configured to acquire images of a geographic area based, at least in part, on an image acquisition pattern 110A-B, respectively. The image acquisition pattern 110A-B may comprise one or more image acquisition parameters. For example, the acquisition pattern 110A-B can include data descriptive of a travel path (e.g., driving path, flight path, flight plan, flight trajectory), one or more location(s) (e.g., identifiers/coordinates for locations for which images are to be acquired), one or more time(s) (e.g., acquisition times, active times, passive times, download times), one or more image acquisition frequencies (e.g., number of times images of an area are captured), one or more zoom level(s), a spatial resolution of the images and/or other information associated with the acquisition of image data of geographic areas. The image acquisition system 104 can control the image-capturing platform(s) 108A-B by adjusting an image acquisition pattern 110A-B (and/or parameters) and/or sending a control command to the image-capturing platform(s) 108A-B. By using the systems and methods of the present disclosure, the image-capturing platform(s) 108A-B can capture lower resolution images (e.g., approximately 1 m/pixel). In some implementations, images can include resolutions such as approximately 30 m/pixel (e.g., LandSat imagery). As such, the image-capturing hardware can be less expensive than required for higher resolution images. Moreover, less bandwidth is needed for the image acquisition system 104 to obtain captured images from the image-capturing platform(s) 108A-B. Also, use of lower resolution imagery data can lead to lower download/downlink times from the image-capturing platform(s) 108A-B.

The system 100 can further include an accessible image database 112 that stores imagery of geographic areas. The image database 112 can be associated with the computing system 102, the image acquisition system 104, and/or another computing system that is separate from the machine learning computing system 102 and the image acquisition system 104. The image database 112 can store various types of image data associated with geographic areas. For instance, the image data can include ground-level images (e.g., street-level panoramic images, sets of light detection and ranging (LIDAR) data, other imagery at or near the level of the ground) as well as overhead images (e.g., images with overhead view). The images can be optical images, infrared images, LIDAR data images, hyperspectral images, or any other type of imagery. The images can be acquired by the image-capturing platform(s) 108A-B, user-submitted imagery (e.g., imagery captured by user), and/or otherwise acquired (e.g., purchased). As described herein, the images can be lower resolution. In some implementations, the images can be used to create a map tile depicting the geographic area that is shown in the image.

Figure 2:
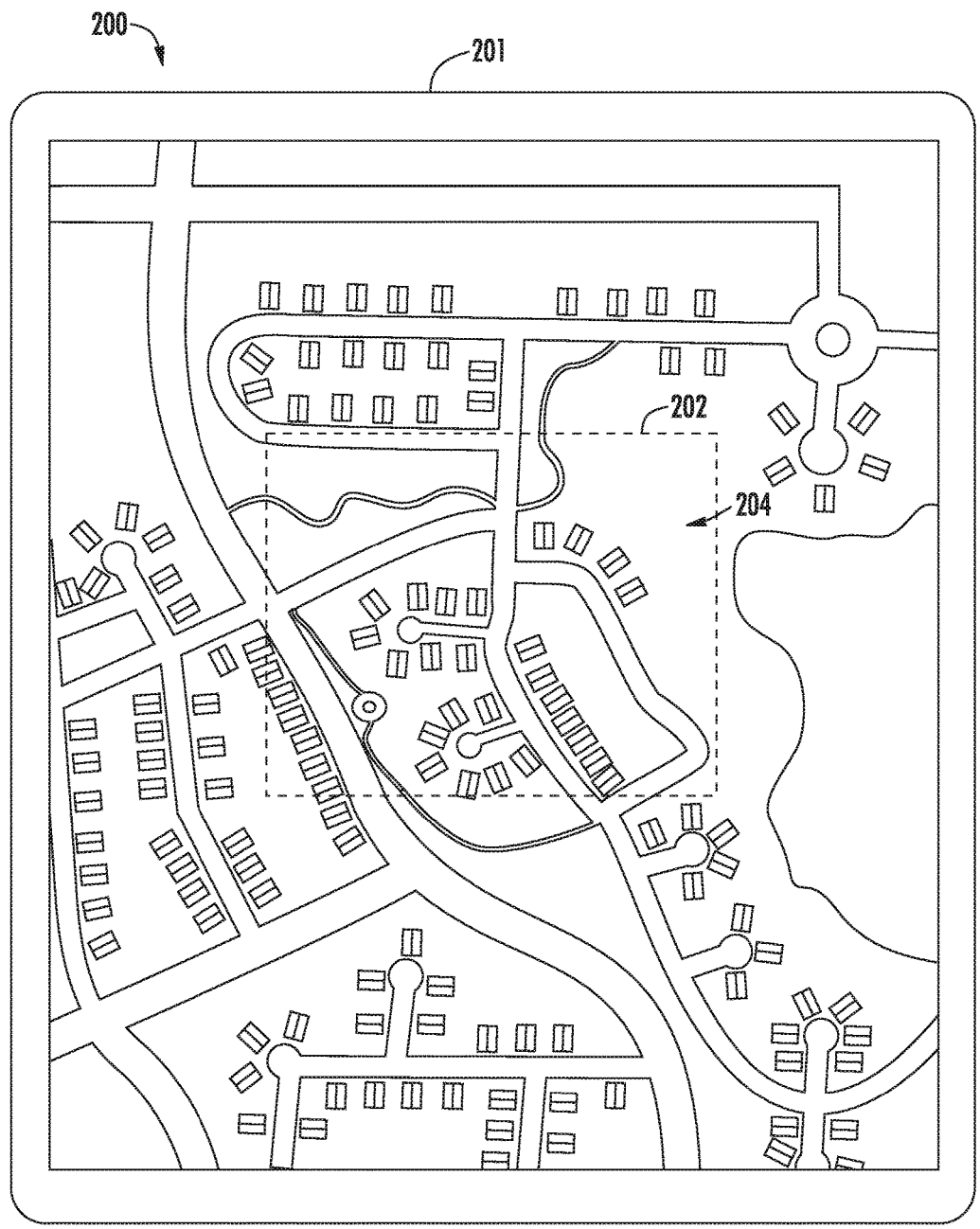
FIG. 2 depicts an example map interface according to example embodiments of the present disclosure.

The computing device(s) 106 can be configured to obtain a map tile of a map interface. For instance, FIG. 2 depicts an example map interface 200 according to example embodiments of the present disclosure. As described herein, the map interface 200 can be a navigable map interface that is displayable on a display device 201 (e.g., of a user device), such as that presented by Google Maps, Google Earth, etc. The map interface 200 can be constructed by a plurality of map tiles. Each tile can present imagery associated with a geographic area. The map tiles can be displayed on the display device 201 such that a user can view and interact with the map interface 200, such as to view various locations represented in the map interface 200. For example, as shown in FIG. 2, the map interface 200 includes a map tile 202. The map tile 202 can present imagery associated with, at least a portion of, a geographic area 204 (e.g., a residential neighborhood). As shown in FIG. 1, the computing device(s) 106 can be configured to obtain data 114 descriptive of the map tile 202 of the map interface 200 from, for example, the map database 103.

Figure 3:
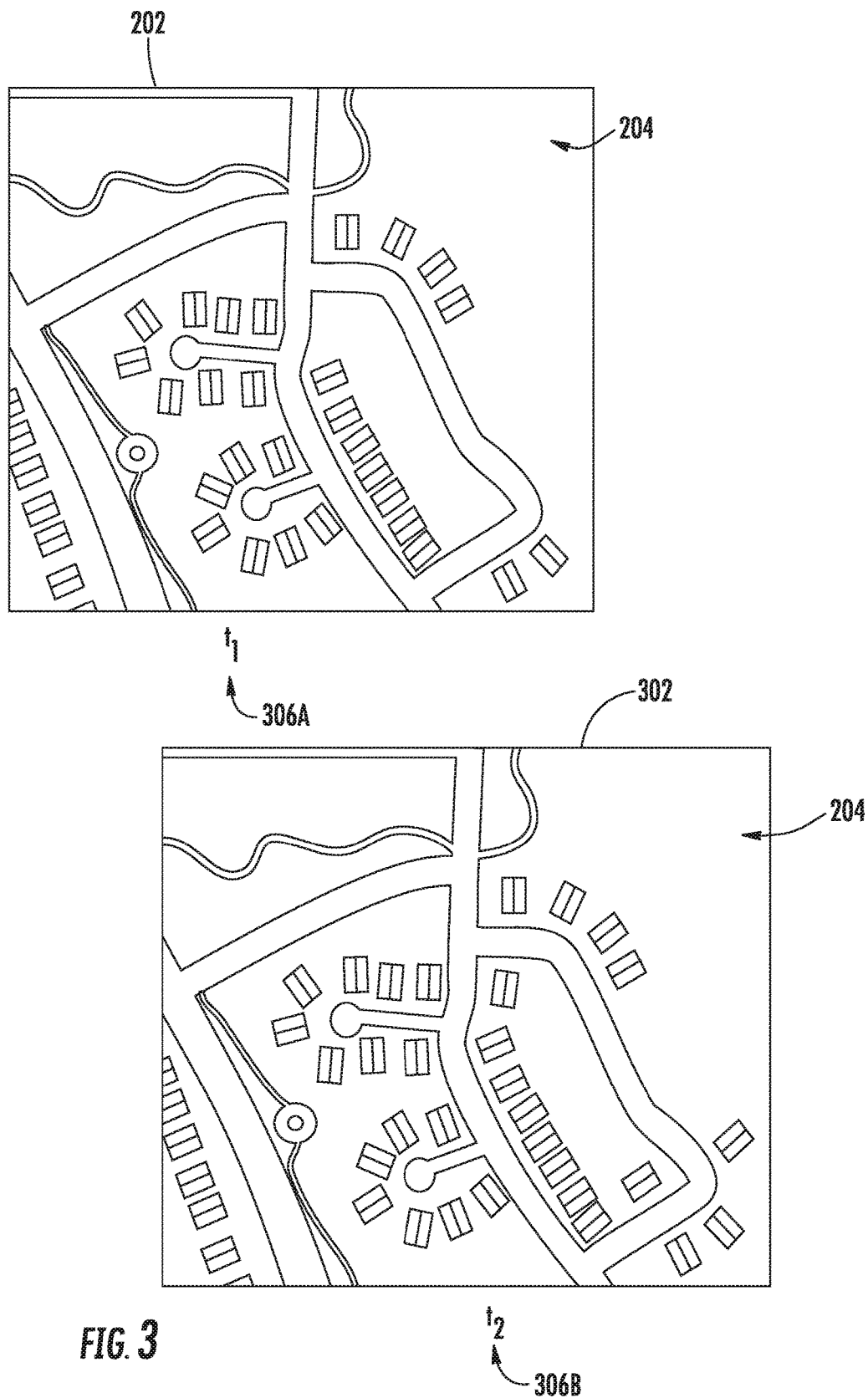
FIG. 3 illustrates an example map tile and image of a geographic area according to example embodiments of the present disclosure.

The computing device(s) 106 can also be configured to obtain data 116 descriptive of an image depicting at least the portion of the geographic area 204. FIG. 3 illustrates the map tile 202 and an image 302 according to example embodiments of the present disclosure. The image 302 can depict at least the portion of the geographic area 204. To facilitate comparison, this can be the same as (or substantially similar to) the geographic area 204 presented in the map tile 202. While the geographic area 204 shown in FIGS. 2 and 3 include a residential neighborhood, this is not intended to be limiting. The geographic area 204 can include a region of a celestial body (e.g., Earth, moon, Mars, other body), region of a country, a state, a municipality, an area defined by land boundaries, a neighborhood, a subdivision, a school district, a shopping center, an office park, body of water, waterway, etc.

The map tile 202 and the image 302 can be associated with different times. For instance, the map tile 202 can be generated at a first time 306A (e.g., $t_1$) and/or generated based on imagery data captured at a first time 306A. The image 302 can be captured and/or acquired by the image acquisition system 104, at a second time 306B (e.g., $t_2$) that is different than (e.g., later than) the first time 306A. The image 302 can be, for instance, one that has been more recently captured by an image-capturing platform 108A-B of an image acquisition system 104 (e.g., than the first time 306A). While FIG. 3 shows only one image 302, those of ordinary skill in the art would understand that more images can be used for the analysis described herein. In some implementations, the data 116 can be descriptive of one or more image(s) depicting, at least a portion of, the geographic area 204.

Returning to FIG. 1, the computing device(s) 106 can be configured to obtain location data 118 associated with a plurality of user devices 120 (e.g., mobile device, personal communication device, smartphone, navigation system, laptop computer, tablet, wearable computing device, other computing device). The location data 118 can be descriptive of a location of a user device and/or a number of user devices 120 located at the geographic area 204. For instance, the location data 118 can include one or more raw location report(s) that include a geocode that identifies a latitude and longitude, coordinates, semantic location, etc. associated with the respective user device 120. Each of the location report(s) can include at least a set of data descriptive of an associated location and time. The user devices 120 can provide the location data 118 (e.g., descriptive of the plurality of location reports) to the computing device(s) 106 and/or the computing device(s) 106 can obtain the location data 118 from another computing device. The computing device(s) 106 can be configured to determine a number of user deices located at the geographic area 204 based, at least in part, on the location data (e.g., via aggregation of location reports).

The computing device(s) 106 can be configured to determine a level of importance 122 (e.g., $L_{IMP}$) associated with the geographic area 204 based, at least in part, on the location data 118. The level of importance 122 can be descriptive of a level of interest in the geographic area 204 based, at least in part, on the number of user devices and/or users indicated to be located at the geographic area 204 (e.g., within a certain time period). The time period can be a recent time period (e.g., a day, a week, a month, a year, a multiple year period). By way of example, the computing device(s) 106 can determine (based, at least in part, on the location data 118) that the number of user devices (e.g., reporting user devices 120) located at the geographic area 204 (e.g., a residential neighborhood) has been high within a recent time frame (e.g., the last few months). In this specific example, the term "high" can be relative to the number of users (and/or user devices) typically or historically located at the geographic area 204. This higher number of user devices can be indicative of a higher level of importance 122 (e.g., user interest, potential area of change, potential construction) associated with the geographic area 204.

In some implementations, the computing device(s) 106 can be configured to identify the map tile 202 based, at least in part, on the level of importance 122 associated with the geographic area 204. For instance, in the event that the level of importance 122 associated with the geographic area 204 is high, the computing device(s) 106 can identify the geographic area 204 (e.g., neighborhood) as an area of interest for which it should determine the occurrence of change. Accordingly, the computing device(s) 106 can obtain data 114 descriptive of a map tile 202 that presents imagery associated with at least a portion of the geographic area 204 and data 116 that is descriptive of at least one image 202

(e.g., depicting at least a portion of the geographic area 204) based, at least in part, on the determined level of importance 122 (e.g., high level of importance indicating user interest). Additionally, and/or alternatively, the computing device(s) 106 can instruct the image acquisition system 104 (e.g., via control command 124) to obtain images associated with the geographic area 204. The image acquisition system 104 can receive the control command 124, and, if needed, the image acquisition system 104 can adjust one or more acquisition pattern(s) 110A-B associated with one or more image-capturing platform(s) 108A-B to acquire recent, new, current, etc. images depicting at least a portion of the geographic area 204. Such images can be included in the data 116 (or other data) sent to and/or obtained by the computing device(s) 106 for image analysis with respect to the geographic area 204.

The computing system 102 can include one or more machine-learned model(s) configured to identify an occurrence of one or more change(s) associated with the geographic area 204. The model(s) can be or can otherwise include various machine-learned models such as neural networks (e.g., deep neural networks) or other multi-layer non-linear models. For example, the computing system 102 can include a machine-learned binary classifier model 126. The binary classifier model 126 can be trained to identify the occurrence of a change within the geographic area 204 (e.g., based on comparison of a map tile and an image). For example, in some implementations, the system 100 can further include a training computing system 128. The training computing system 128 can be separate from the computing system 102 and/or can be a portion of the computing system 102.

FIG. 3 illustrates the training of an example machine-learned model according to example embodiments of the present disclosure. The training computing system 128 can include a model trainer 402 that trains a machine-learned model such as, for example, the binary classifier model 126 stored at the machine learning computing system 102 using various training or learning techniques. In particular, the model trainer 402 can train the binary classifier model 126 based on a set of training data 304. In some implementations, the training data 304 can be provided or otherwise selected by the computing system 102 (e.g., from the database 103, database 112).

In some implementations, the model trainer 402 can train the machine-learned binary classifier model 126 using training data 304 descriptive of map tiles and/or images that depicts known instances where change has occurred and/or known instances where change has not occurred. For example, known instances where change has occurred can correspond to historical and/or expert-identified instances of change within a geographic area. Known instances where change has not occurred can also correspond to historical and/or expert-identified instances where change has not occurred within a geographic area. For example, a model can be trained using training data 304 that includes one or more map tile(s) and/or one or more image(s) that are labeled as either depicting change or not depicting change ("binary training data"). The training data 304 can include a map tile-image pair, that includes a map tile and a corresponding image depicting the same geographic area. Additionally, and/or alternatively, the training data 304 could be data that includes labels according to some change metric (e.g., one to one-hundred, type of change). In some implementations, the training data 304 can be labeled according to other ground-truth collection systems. In some implementations, the training data 304 can include a time series of map tiles and/or images depicting a geographic area, each training example providing information sufficient to determine, for each map tile and/or image in the time series, a difference between map tiles generated and/or images captured at different times.

Additionally, and/or alternatively, the training data 304 can include lower resolution images, such that the machine-learned model (e.g., the binary classifier model 126) can learn to evaluate images of lower resolution. This can ultimately allow the computing system 102 to evaluate images of lower resolution, which can lead to usage of a wider range of images, faster processing time, as well as increased bandwidth for data transfer.

The training computing system 128 can train a machine-learned model based, at least in part, on the training data 304. For instance, the training computing system 128 can input training data 304 (e.g., pairs of map tiles and corresponding images identified as either depicting change or not depicting change). The training computing system 128 can receive a training output 306 descriptive of the model's classification of the occurrence of change within the training data 304 (e.g., whether change has occurred or whether change has not occurred). The training computing system 128 can analyze the training output 306 to determine the accuracy of the machine-learned model. For instance, the training computing system 128 can compare the output 306 to the training data 304 to determine whether the model correctly identified the occurrence of change. If further training is required (e.g., to increase one or more confidence level(s), to increase accuracy), the training computing system 128 can provide additional training data 304 and/or indicate that adjustments may need to be made to the model.

By way of example, the machine-learned binary classifier model 126 can be trained to identify the occurrence of a change based, at least in part, on a comparison of one or more visual characteristic(s) associated with a map tile and one or more visual characteristic(s) associated with an image. The visual characteristic(s) can include depicted objects, pixel color, hue, intensity, tone, other characteristics, etc. The binary classifier model 126 can be trained to identify the visual characteristic(s) associated with at least a portion of a map tile and/or an image. For instance, the machine-learned binary classifier model 126 can be trained (e.g., via training data 304) to identify a first set of visual characteristic(s) in a first portion (e.g., cell) of the map tile 202 and a second set of visual characteristic(s) in a second portion (e.g., cell) of the image 302. The machine-learned binary classifier model 126 can be trained to identify the occurrence of one or more change(s) in the geographic area 204 based, at least in part, on a comparison of the first set of visual characteristic(s) and the second set of visual characteristic(s), as further described below.

Returning to FIG. 1, the computing device(s) 106 can be configured to analyze, at least a subset of, the data 114 descriptive of the map tile 202 and the data 116 descriptive of the image 302 to determine an occurrence of a change associated with the geographic area 204. For instance, the computing device(s) 106 can analyze the map tile 202 and the image 302 on a granular, cellular level to identify change within a sub-region of the geographic area 204 in a binary manner. This can include, for example, classifying whether a change has not occurred in a sub-region of the geographic area 204 (e.g., "0") or whether a change has occurred in a sub-region of the geographic area 204 (e.g., "1") based on the comparison of the map tile 202 and the image 302 at a granular, cellular level. By identifying the change in a binary manner within the sub-regions of the geographic area 204, the computing system 102 can utilize lower resolution images, than may be needed to determine a magnitude of change within an individual sub-region.

Figure 5:
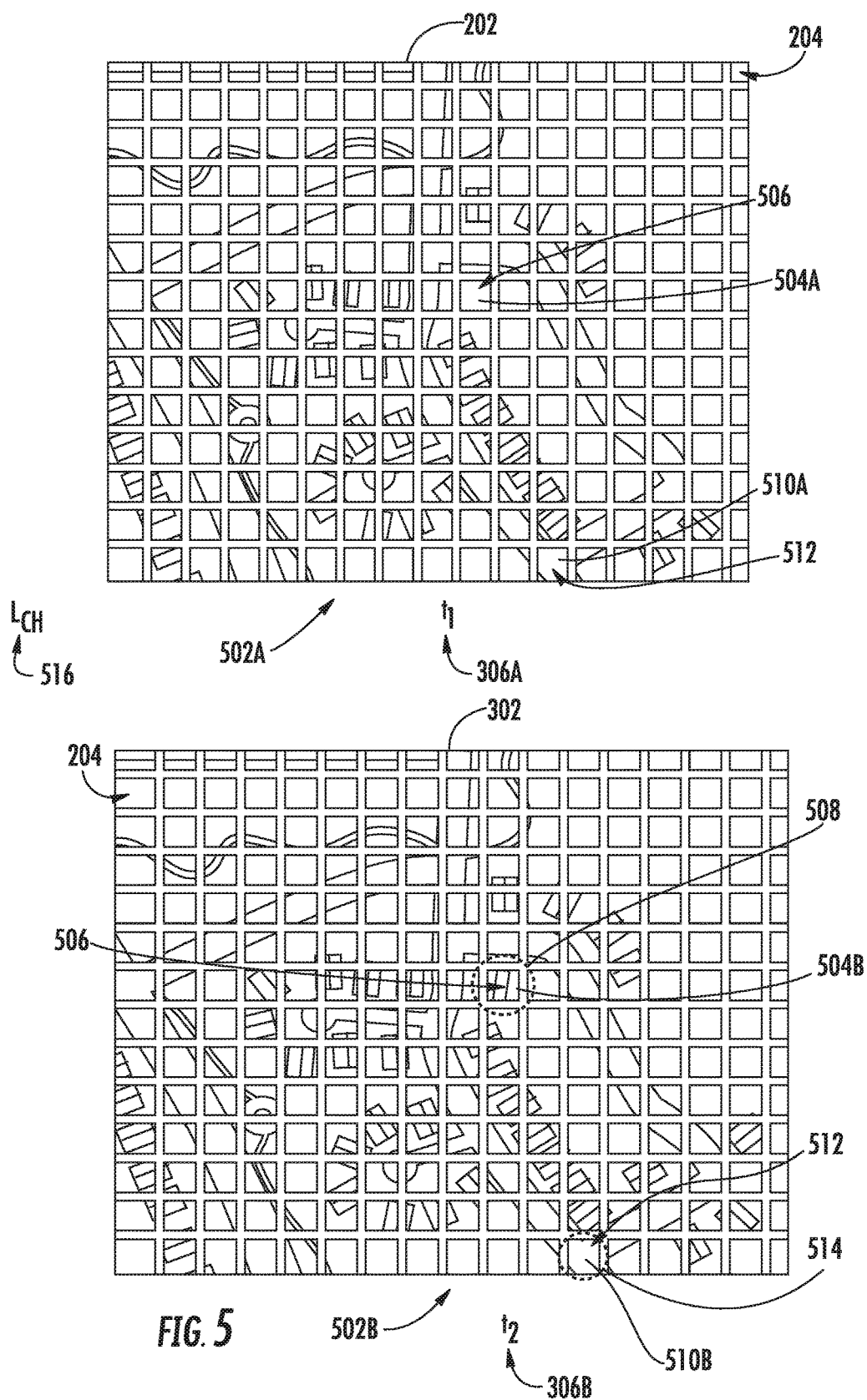
FIG. 5 depicts an example map tile and image split into portions according to example embodiments of the present disclosure.

FIG. 5 depicts an example map tile and image split into portions according to example embodiments of the present disclosure. For instance, the computing device(s) 106 can identify a first plurality of cells 502A associated with the map tile 202 and a second plurality of cells 502B associated with the image 302. A cell can be a portion of a map tile or image. A cell can include, for instance, an area made up of pixels of the respective map tile or image. In some implementations, the computing device(s) 106 can identify the cells 502A-B based, at least in part, on a mathematical area of an individual cell and/or on a number of pixels that are intended to define the mathematical area of an individual cell. In some implementations, the number of pixels and/or mathematical area can be pre-defined, while in some implementations, the number of pixels and/or mathematical area can be selected based, at least in part, on conditions (e.g., size, resolution, view angle, etc.) associated with the map tile 202 and/or image 302. Each cell 502A-B can be associated with a particular sub-region of the geographic area 204. In some implementations, the cells 504A-B can be identified such that one or more particular sub-region(s) are represented in the respective cells.

The computing device(s) 106 can be configured to identify, for each of the map tile 202 and the image 302, a cell associated with a sub-region of the geographic area 204. For instance, the computing device(s) 106 can be configured to select a first cell 504A of the first plurality of cells 502A and a second cell 504B of the second plurality of cells 502B. Both the first cell 504A and the second cell 504B can be associated with a sub-region 506 of the geographic area 204. By way of example, the geographic area 204 can be a neighborhood (or a section of a neighborhood) and the sub-region 506 can be associated with a sub-region of the neighborhood, such as a land plot within the neighborhood. The sub-region 506 associated with the first cell 504A is the same as the sub-region 506 associated with the second cell 504B to facilitate the comparison of the first and second cells. The map tile 202 and, thus, the first cell 504A, can be associated with the first time 306A (e.g., $t_1$). The image 302 (and the second cell 504B) can be associated with the second time 306B (e.g., $t_2$), which is different than the first time 306A. As such, the computing device(s) 106 can analyze the cells to identify whether a change occurred in the sub-region 506 between the first and second times 306A-B.

Figure 6:
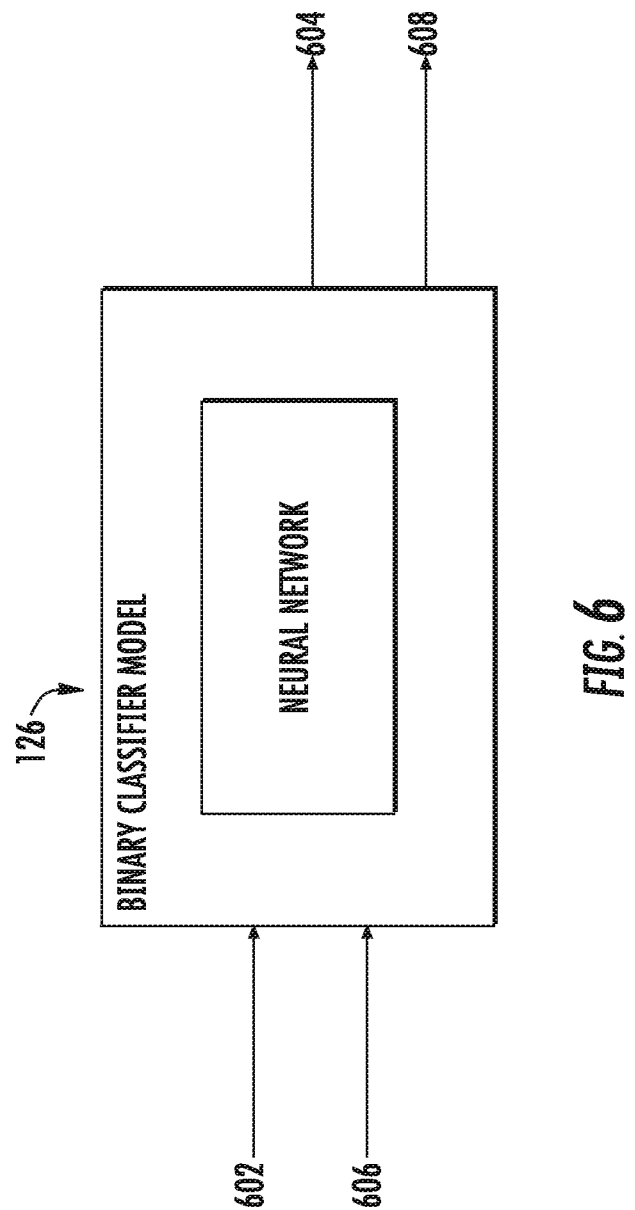
FIG. 6 depicts an example machine-learned model according to example embodiments of the present disclosure.

The computing device(s) 106 can be configured to input data descriptive of at least a portion of the map tile 202 and at least a portion of the image 302 into the machine-learned binary classifier model 126. As shown in FIG. 6, the computing device(s) 106 can input data 602 descriptive of, at least a portion of, the map tile 202 and the image 302 into the machine-learned binary classifier model 126 to identify an occurrence of one or more change(s) associated with the geographic area 204. For instance, the computing device(s) 106 can be configured to input data 602 descriptive of the first cell 504A and the second cell 504B into a machine-learned binary classifier model 126 to identify an occurrence of a change associated with the sub-region 506 of the geographic area 204. The data 602 can include image data associated with the sub-region 506 depicted in each of the respective cells. For example, the data 602 can include data descriptive of the pixels included in the cells 504A-B, data descriptive of the visual characteristics of such pixels, and/or other data or metadata associated with the map tile 202, image 302, and/or their individual cells (e.g., 504A-B). The binary classifier model 126 can examine and compare (e.g., using its neural networks) the visual characteristics of the cells 504A-B to identify an occurrence of a change—which can be whether change has occurred (e.g., with respect to the sub-region 506) or whether change has not occurred (e.g., with respect to the sub-region 506). In the event that the map tile 202 and the image 302 are of a different format, the model 126 can be encoded such that the computing system 102 can adjust the format of at least one of the map tile 202 and the image 302 such that a comparison of visual characteristics can be accomplished. In some implementations, another computing device can be used to adjust the format of the map tile 202 and/or the image 302, and adjusted data can be sent to and received by the computing device(s) 106 for analysis.

The computing device(s) 106 can be configured to receive a first output 604 from the binary classifier model 126. The output 604 can be descriptive of the occurrence of a change associated with the sub-region 506 of the geographic area 204. By way of example, with reference again to FIG. 5, the machine-learned binary classifier model 126 can analyze the first set of visual characteristics associated with the first cell 504A and the second set of visual characteristics associated with the second cell 504B. As shown in FIG. 5, the sub-region 506 does not include any portion of a structural asset in the first cell 504A of the map tile 202, at the first time 306A (e.g., showing an empty land plot). In the second cell 504B, the sub-region 506 includes at least a portion of a structural asset (e.g., building). The binary classifier model 126 can analyze the cells to determine whether the object depiction, pixel color, intensity, other visual characteristics, etc. of the first cell 504A are different than those of the second cell 504B. In the event that the binary classifier model 126 can determine that there is a difference between the respective cells 504A-B that is indicative of a change (e.g., the addition of a structural asset) above a confidence level, the binary classifier model 126 can identify the occurrence of a change 510 within the target region 506 (e.g., change having occurred). The confidence level can be developed and/or refined during the training of the binary classifier model 126 and/or during data analysis. The first output 604 can indicate that change associated with the target region 506 of the geographic area 204 has occurred. For instance, the change 508 associated with the sub-region 506 can be, for example, building churn (e.g., a change in one or more buildings). The output 604 can be a "1", which can indicate that the binary classifier model 126 has determined that a change 508 has occurred in the sub-region 506 based, at least in part, on the map tile 202 and the image 302. In some implementations, the output 604 may be represented by other numbers (e.g., weighted by sub-region) and/or characters.

Figure 4:
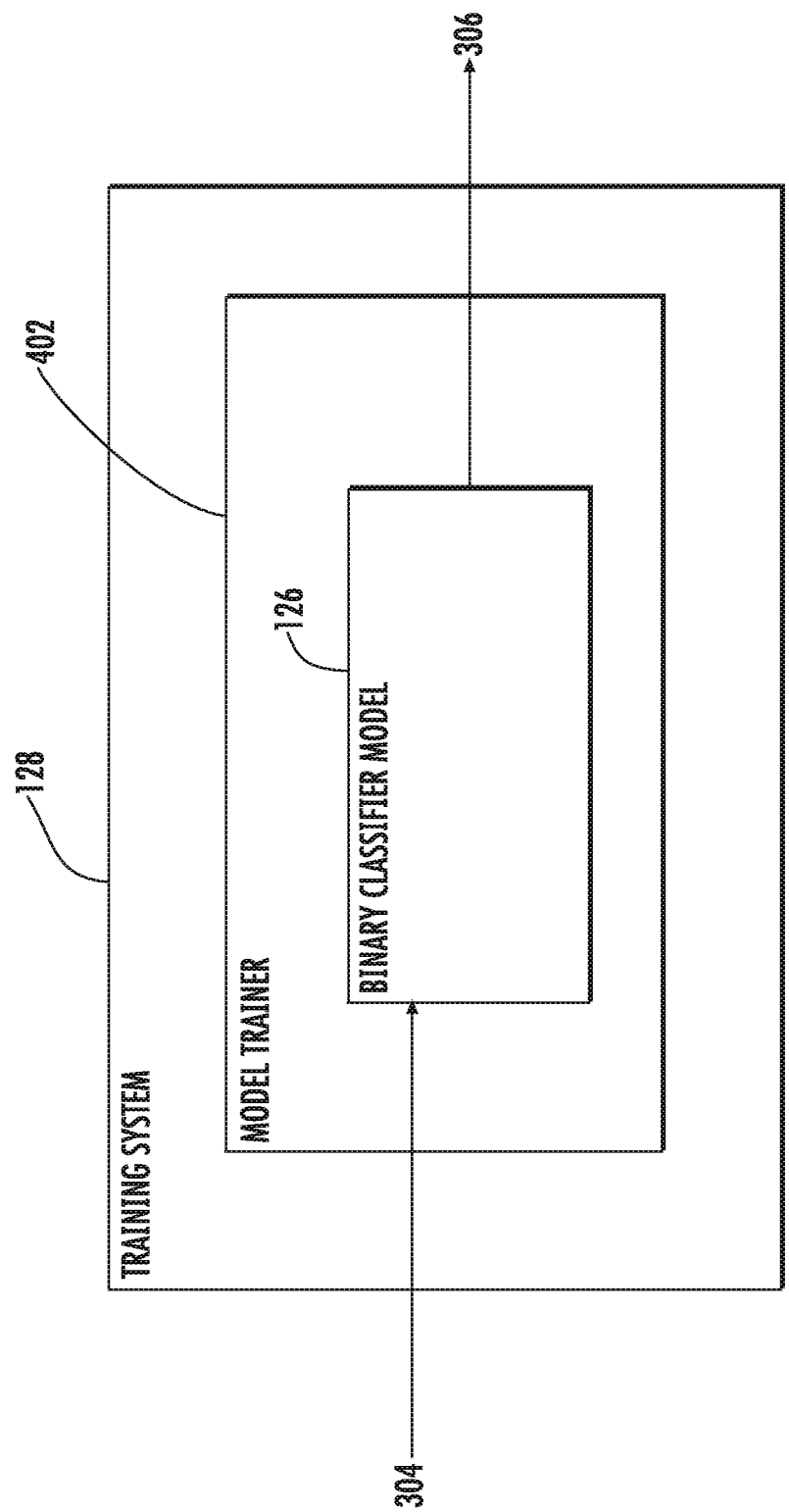
FIG. 4 depicts the training of a machine-learned model according to example embodiments of the present disclosure.

While FIG. 4 depicts the change 508 as associated with a structural asset, this is not intended to be limiting. The change 508 can be associated with other elements associated with a geographic area and depicted in a map tile and/or an image, such as transportation assets (e.g., roads, travel ways), environmental assets (e.g., plants, soil, waterways), agricultural assets (e.g., crops, farm land, irrigation systems), etc.

As shown in FIG. 6, the computing device(s) 106 can be configured to provide data 606 descriptive of other cells of the first and second pluralities of cells 502A-B as another input to the binary classifier model 126 to identify an occurrence of one or more change(s) associated with one or more other sub-region(s) of the geographic area 204. The computing device(s) 106 can receive a second output 608 from the binary classifier model 126. The second output 608 can be descriptive of the occurrence of one or more change(s) associated with one or more of the other sub-region(s) of the geographic area 204.

For example, returning to FIG. 5, the computing device(s) 106 can input data descriptive of cells 510A-B, which include a depiction of a transportation asset (e.g., neighborhood road) within sub-region 512. The binary classifier model 126 can compare the cells 510A-B (e.g., the visual characteristics associated therewith). In the event that the binary classifier model 126 determines that there is a slight or no difference between the respective characteristics of the cells 510A-B (e.g., above a confidence level), the binary classifier model 126 can identify the occurrence of the change 514 as: no change having occurred within the sub-region 512. For example, the binary classifier model 126 can determine that no road churn (e.g., a change in one or more travel ways) has occurred within the sub-region 512. Accordingly, the second output 608 can indicate that change associated with the sub-region 512 of the geographic area 204 has not occurred. For instance, the output 608 can be a "0", which can indicate that the binary classifier model 126 has determined that no change has occurred in the sub-region 512 based, at least in part, on the map tile 202 and the image 302. By using the binary classifier model 126, the systems and methods described herein can evaluate the change of a geographic area 204 using lower resolution images, as described herein.

The above-described analysis can be repeated for one or more other cell(s) of one or more other image(s). For example, the computing device(s) 106 can input data associated with a map tile and other images into the binary classifier model 126. The data associated with the other images can be descriptive of cells associated with the same sub-region 506 to determine if additional changes have occurred in the sub-region 506. Additionally, and/or alternatively, the data descriptive of the other images can be descriptive of cells associated with one or more different sub-region(s) of the geographic area 204. This can allow the computing device(s) 106 to determine if one or more change(s) have occurred in the other sub-regions of the geographic area 204 presented in the imagery of the map tile 202. In some implementations, this can be repeated until a certain number (e.g., majority, all), percent, ratio, etc. of the cells and/or sub-regions have been analyzed by the binary classifier model 126 in the manner described above.

The computing device(s) 106 can determine a level of change 516 associated with the geographic area 204 based, at least in part, on the occurrence of one or more change(s) (e.g., 508, 514) associated with the geographic area 204. As described above, the level of change 516 can be the overall amount of change (e.g., to its structural assets, transportation assets, environmental assets, agricultural assets, other assets) experienced by the geographic area 204. In some implementations, the computing device(s) 106 can determine the level of change by aggregating the change occurrences (e.g., 508, 514) determined for each of the sub-regions of the geographic area 204.

For example, the computing device(s) 106 can aggregate the binary classifications (e.g., 0, 1) determined for each sub-region (e.g., 506, 512) of the geographic area 204 and/or identified in the associated output (e.g., 604, 608). The level of change 516 for a geographic area 204 can be determined by adding the binary classifications (e.g., 0, 1) determined for each sub-region (e.g., 506, 512) of the geographic area 204. For example, the geographic area 204 can be divided into 224 cells, each depicting a sub-region. The binary classifier model 126 can determine that a change has not occurred in 150 of the cells and/or sub-regions (e.g., outputting a "0"), while a change has occurred in 74 of the cells and/or sub-regions (e.g., outputting a "1"). The level of change 516 for the geographic area 204 can, thus, be 74, representing a summation of the binary classifications (e.g., 150 "0's"+74 "1's"). This value can further be normalized (e.g., 74/(74+150)=0.33) to normalize away the size of cell.

In some implementations, the level of change 516 can indicate the level of change per square distance. For example, the computing device(s) 106 can determine the level of change by dividing the aggregated level of change by the square distance of the geographic area 204 represented in the map tile 202 and/or the image 302. In some implementation, the computing device(s) 106 can determine the level of change based, at least in part, on the change classifications identified in a group of cells (e.g., cell 504A and the immediately surrounding eight cells) divided by the square distance represented by the sub-regions depicted in those cells.

In some implementations, the computing device(s) 106 can determine the level of change 516 based, at least in part, on a weighted approach. The computing device(s) 106 can assign a weight to the cells of a map tile and/or image such that change identified in certain cells are afforded a higher weight for the level of change 516 and/or certain cells are afforded a lower weight for the level of change 516. By way of example, the computing device(s) 106 may afford a higher weight to a change in a sub-region 506 of a cell 504A-B located towards the center of the map tile 202 and/or the image 302, and a lower weight to a change in a sub-region 512 of a cell 510A located at a periphery of the map tile 202 and/or the image 302. To do so, the computing device(s) 106 can multiply the binary classification (e.g., 0, 1) by a numerical weight identifier (e.g., percent, fraction) and perform an aggregation of the weighted classifications to determine the level of change 516.

Returning to FIG. 1, the computing device(s) 106 can be configured to update the map interface 200 to reflect a change 508 associated with the geographic area 204 based, at least in part, on the occurrence of the change 508 associated with the geographic area 204. For instance, the computing device(s) 106 can be configured to provide a control command 130 to a map tile management system 132 to create a new map tile to reflect the one or more change(s) (e.g., 508) identified in the geographic area 204. Additionally, and/or alternatively, the map tile management system 132 can update the map tile 202 to reflect the identified change(s). In general, the map tile management system may be configured such that it will only create a new map tile or update a map tile in the event that it receives a specific control command relating to the map tile in question; in this way, the system can avoid re-generating map tiles in which no changes have occurred in the geographic area since the tile was last updated.

The map tile management system 132 can receive the control command 130 and can be configured to generate a new map tile and/or communicate with the map database 103 to update the map tile (e.g., 202) to reflect the one or more identified change(s) (e.g., 508). For instance, the map tile management system 132 can create a new map tile (e.g., reflecting the change 508) and send the new map tile to the image database 103 such that it is accessible by the computing device(s) 106 for rendering the map interface 200. The new map tile can be based, at least in part, on the image 302 depicting (at least a portion of) the geographic area 204. Additionally, and/or alternatively, the map tile management system 132 can access the map database 103 and update one or more map tile(s) to reflect the identified change(s), such that the computing device(s) 106 can access the updated map tiles from the map database 103. In some implementations, the map tile management system 132 can send the new and/or update map tile to the computing device(s) 106.

Figure 7:
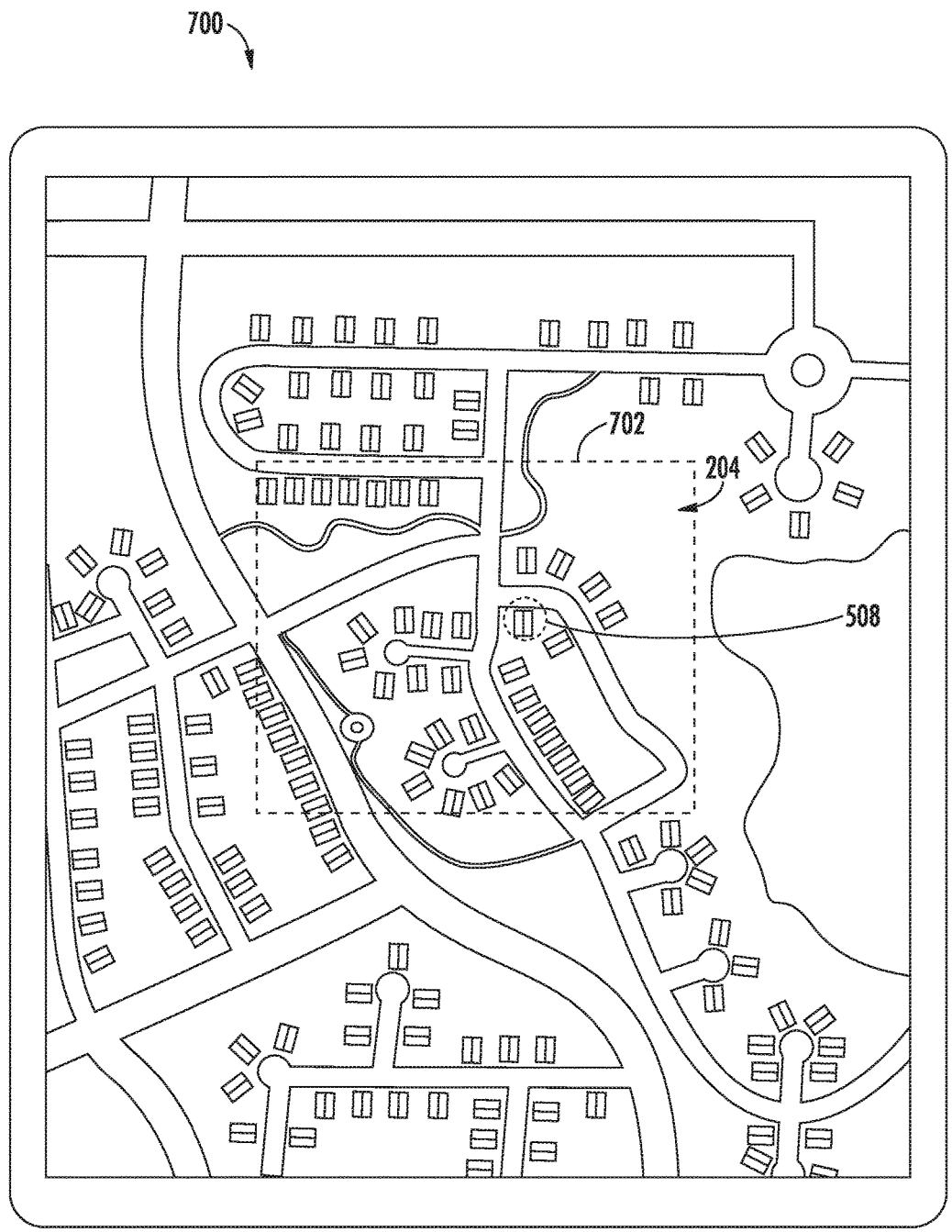
FIG. 7 depicts an example updated map interface according to example embodiments of the present disclosure.

The computing device(s) 106 can be configured to replace the map tile 202 of the map interface 200 with a new map tile that reflects the change in the geographic area 204 and/or use an updated map tile when presenting the map interface 200. For example, FIG. 7 depicts an example updated map interface 700 according to example embodiments of the present disclosure. The updated map interface 700 can correspond to an updated version of the map interface 200 of FIG. 2, with the map tile 702. The map tile 702 can be, for example, a new map tile that reflects the one or more change(s) (e.g., 508) in the geographic area 204 and replaces the map tile 202. Additionally, and/or alternatively, the map tile 702 can be an updated version of the map tile 202, which reflects the one or more change(s) (e.g., 508) in the geographic area 204.

Returning to FIG. 1, in some implementations, the map interface 200 can be updated based, at least in part, on the level of change 516. For instance, the computing device(s) 106 can be configured to determine a level of change 516 associated with the geographic area 204 based, at least in part, on the occurrence of the change 508, as described herein. The computing device(s) 106 can be configured to determine whether the level of change exceeds a threshold level 134. The threshold level 134 can be indicative of a significant level of change and/or rate of change indicating that the map tile 202 is not an accurate representation of the current status of the geographic area 204 and, thus, the map tile 202 should be adjusted (e.g., updated, replaced). The computing device(s) 106 can be configured to update the map interface 200 (e.g., to replace map tile 202, update map tile 202) when the level of change 516 exceeds the threshold level 134.

In some implementations, the computing device(s) 106 can update the map interface 200 based, at least in part, on the level of importance 122 being above an importance threshold 136. The importance threshold 136 can be indicative of a high level of importance (e.g., user device traffic). In the event that the level of importance 122 is above the importance threshold 136, the computing device(s) 106 can update the map interface 200 (including the geographic area 204) when change has occurred in the geographic area 204.

In some implementations, the computing device(s) 106 can be configured to provide a control command 129 to the image acquisition system 104 to adjust an acquisition of imagery data associated with the geographic area 204 based, at least in part, on the level of change 516. The image acquisition system 104 can receive the control command 129 and perform various actions. For instance, in the event that the level of change 516 associated with the geographic area 204 is above the threshold 134 (and/or another threshold) the control command 129 can instruct the image acquisition system 104 to increase the acquisition of imagery data associated with the geographic area 204. The control command 129 can instruct the image acquisition system 104 to increase the amount, timing, frequency, etc. with which images of the geographic area 204 are acquired. This can improve map interface computing technology be such that the computing system 102 is appropriately refreshing the map tiles to reflect the changes occurring in a geographic area 204 that is experiencing a high level of change. As such, the computing system 102 can make sure to refresh the map interface 200 (and its map tiles) to more accurately reflect change in a geographic area 204. This can lead to efficient allocation of processing resources to adjust the portions of the map interface 200 that need refreshing.

In the event that the level of change 516 is below the threshold 134 (e.g., indicative of a lower level of change or no change has occurred) the computing device(s) 106 may cease providing a command control to adjust the acquisition of imagery data associated with the geographic area 204. In some implementations, if the level of change 516 is low, the computing device(s) 106 can provide a control command to the image acquisition system 104 to decrease the acquisition of imagery data associated with the geographic area 204. This can allow the computing system 102 and/or the image acquisition system 104 to prevent its computational resources from being used on areas experiencing lower levels of change, that do not need refreshing (e.g., based on current imagery). The image acquisition system 104 can receive the control command and can adjust imagery acquisition accordingly (e.g., to increase, decrease acquisition via the image-capturing platform(s)).

In some implementations, the computing device(s) 106 can generate a graphical representation descriptive of the level of change 516 associated with the geographic area 204. The graphical representation can be, for example, a heatmap indicating the levels of change associated with one or more geographic area(s) 204 (e.g., map tiles) within the map interface 200. In some implementations, the levels of change can be represented in another graphical form (e.g., bar chart, histogram). This can indicate which map tiles may need to be adjusted (e.g., due to high levels of change). In some implementations, the control command 130 (provided to the map tile management system 132) can be based, at least in part, on the graphical representation. In this way, the system can effectively allocate its map tile processing resources to generate and/or update map tiles for geographic areas experience high levels of change. In some implementations, the control command 129 to adjust the acquisition of imagery data associated with the geographic area 204 can be based, at least in part, on the graphical representation. For example, the control command 129 can instruct the image acquisition system 104 to adjust one or more acquisition pattern(s) 110A-B based, at least in part, on the graphical representation (e.g., heat map). Thus, the system can effectively allocate its imaging resources to acquire more frequent imagery of geographic areas experiencing higher levels of change and less frequent imagery of geographic areas experiencing lower levels of change. This can provide a more focused, useful set of map tiles and/or imagery data that more accurately reflect the status of geographic areas in a map interface.

The image acquisition system 104 can adjust the acquisition of imagery data associated with the geographic area 204 using a variety of approaches. For instance, the image acquisition system 104 can adjust an acquisition pattern 110A-B associated with at least one of the street-level platforms 108A and the aerial platforms 108B. For example, a travel path 136A-B (e.g., driving path, flight path) and/or a frequency 138A-B (e.g., frequency with which images of the geographic area 204 are captured with the image capturing platforms 108A-B) can be adjusted such that the image capturing platforms 110A-B can capture images associated with the geographic area 204 more or less often. Additionally, and/or alternatively, in some implementations, the image acquisition system 104 can adjust the purchase patterns, download patterns, request patterns, etc. by which the image acquisition system 104 acquires images of the geographic area 204 from other computing device(s) and/or users. For instance, the image acquisition system 104 can request more frequent imagery (e.g., from third parties), more frequently purchase imagery, and/or solicit for imagery of geographic areas experiencing higher levels of change.

Figure 8:
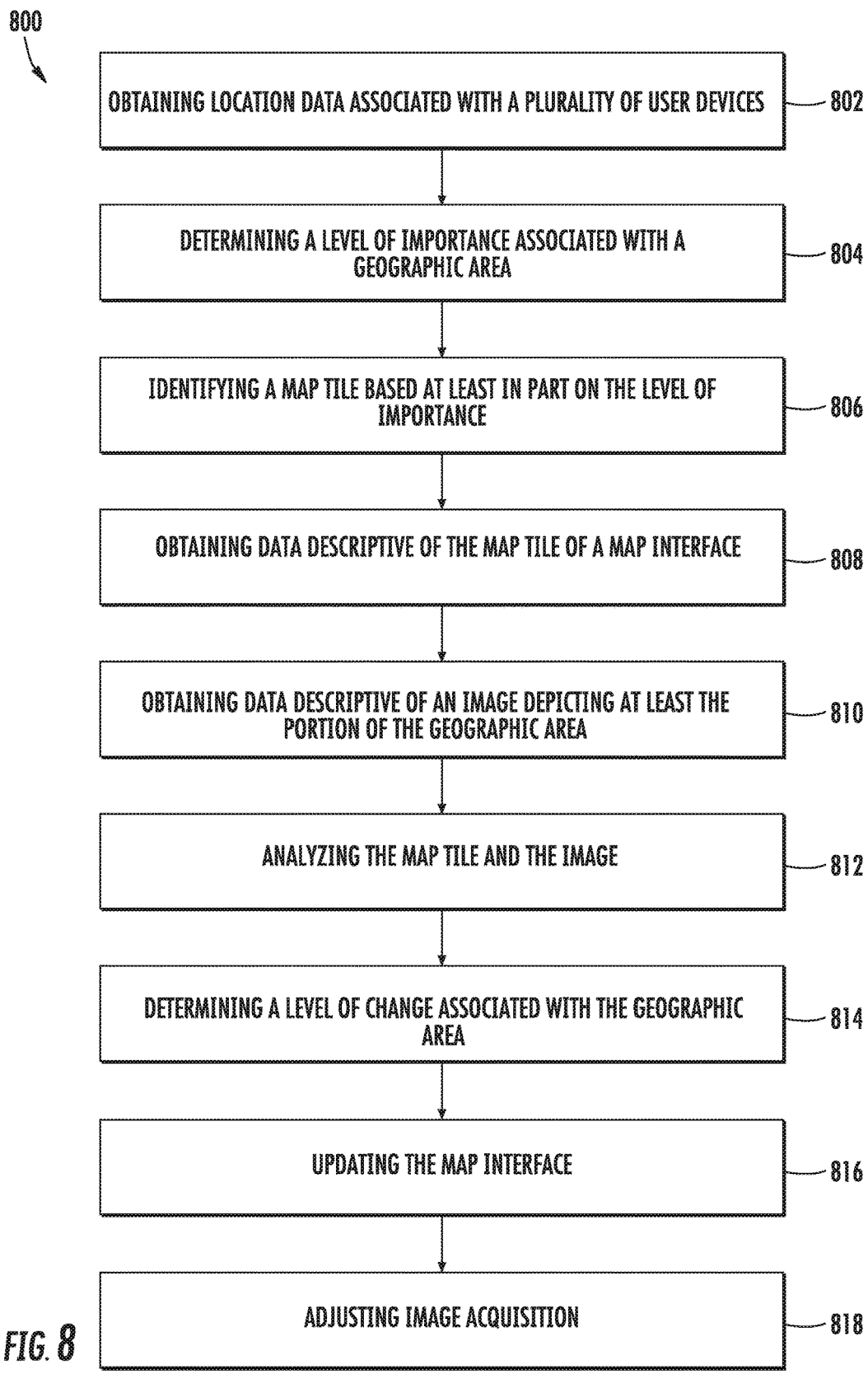
FIG. 8 depicts a flow diagram of an example method according to example embodiments of the present disclosure.

FIG. 8 depicts a flow diagram of an example method 800 according to example embodiments of the present disclosure. One or more portion(s) of the method 800 can be implemented by one or more computing device(s) such as, for example, those shown in FIGS. 1 and 10. FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (802), the method 800 can include obtaining location data associated with a plurality of user devices. For instance, the computing device(s) 106 can obtain location data 118 associated with a plurality of user devices 120. The location data 118 can be descriptive of a number of user devices located at a geographic area 204. As described above, the location data 118 can include raw location report(s) descriptive of a geocode that identifies a location associated with the respective user device 120.

At (804), the method 800 can include determining a level of importance associated with the geographic area. For instance, the computing device(s) 106 can determine a level of importance 122 associated with the geographic area 204 based, at least in part, on the number of user devices 120 located at the geographic area 204. The level of importance 122 can be indicative of a level of interest in the geographic area 204, the amount of user traffic associated with the geographic area 204, etc. In some implementations, a higher number of user devices 120 can be indicative of a higher level of importance (e.g., user interest, potential area of change, potential construction) associated with the geographic area 204.

The computing device(s) 106 can identify the geographic area based, at least in part, on the level of importance. For instance, in the event that the number of user devices 120 located at the geographic area 204 is high (e.g., relative to a typical, historical number of user devices located at the geographic area 204), the level of importance 122 associated with the geographic area 204 can be high. Accordingly, the computing device(s) 106 can identify the geographic area 204 as an area-of-interest, for which it should use the systems and methods described herein to determine whether change is occurring in the area.

At (806), the method 800 can include identifying a map tile based, at least in part, on the level of importance associated with the geographic area. For instance, the computing device(s) 106 can identify one or more map tile(s) (e.g., the map tile 202) that present imagery associated with at least a portion of the geographic area 204 based, at least in part, on the level of importance 122 associated with the geographic area 204. By way of example, in the event that the computing device(s) 106 identify the geographic area 204 as an area-of-interest (e.g., due to a higher level of importance), the computing device(s) 106 can identify the map tile 202 (depicting at least of portion of the geographic area 204) to be used in the change detection analysis, as described herein.

At (808), the method 800 can include obtaining data descriptive of the map tile of a map interface. For instance, the computing device(s) 106 can obtain data 114 descriptive of a map tile 202 of a map interface 200 that is displayable on a display device 201. The map tile 202 can present imagery associated with at least a portion of a geographic area 204. The computing device(s) 106 can obtain the data 114 from the map database 103. Additionally, and/or alternatively, the map tile 202 can be the map tile identified based on the level of importance 122 associated with the geographic area 204, as described above.

At (810), the method 800 can include obtaining data descriptive of an image depicting at least the portion of the geographic area. For instance, the computing device(s) 106 can obtain data 116 descriptive of an image 302 depicting at least a portion of the geographic area 204. The image 302 can depict the same portion of the geographic area 204 as the map tile 202. The image 302 can be acquired by an image acquisition system 104. In some implementations, the image 302 can be acquired by one or more street-level platform(s) 108A and/or one or more aerial platform(s) 108B.

At (812), the method 800 can include analyzing the map tile and the image. For instance, the computing device(s) 106 can analyze the data 114 descriptive of the map tile 202 and the data 116 descriptive of the image 302 to determine an occurrence of a change associated with the geographic area 204. The computing device(s) 106 can input data 602 descriptive of at least a portion of the map tile 202 and the image 302 into a machine-learned model (e.g., the binary classifier model 126) to identify whether a change has occurred.

Figure 9:
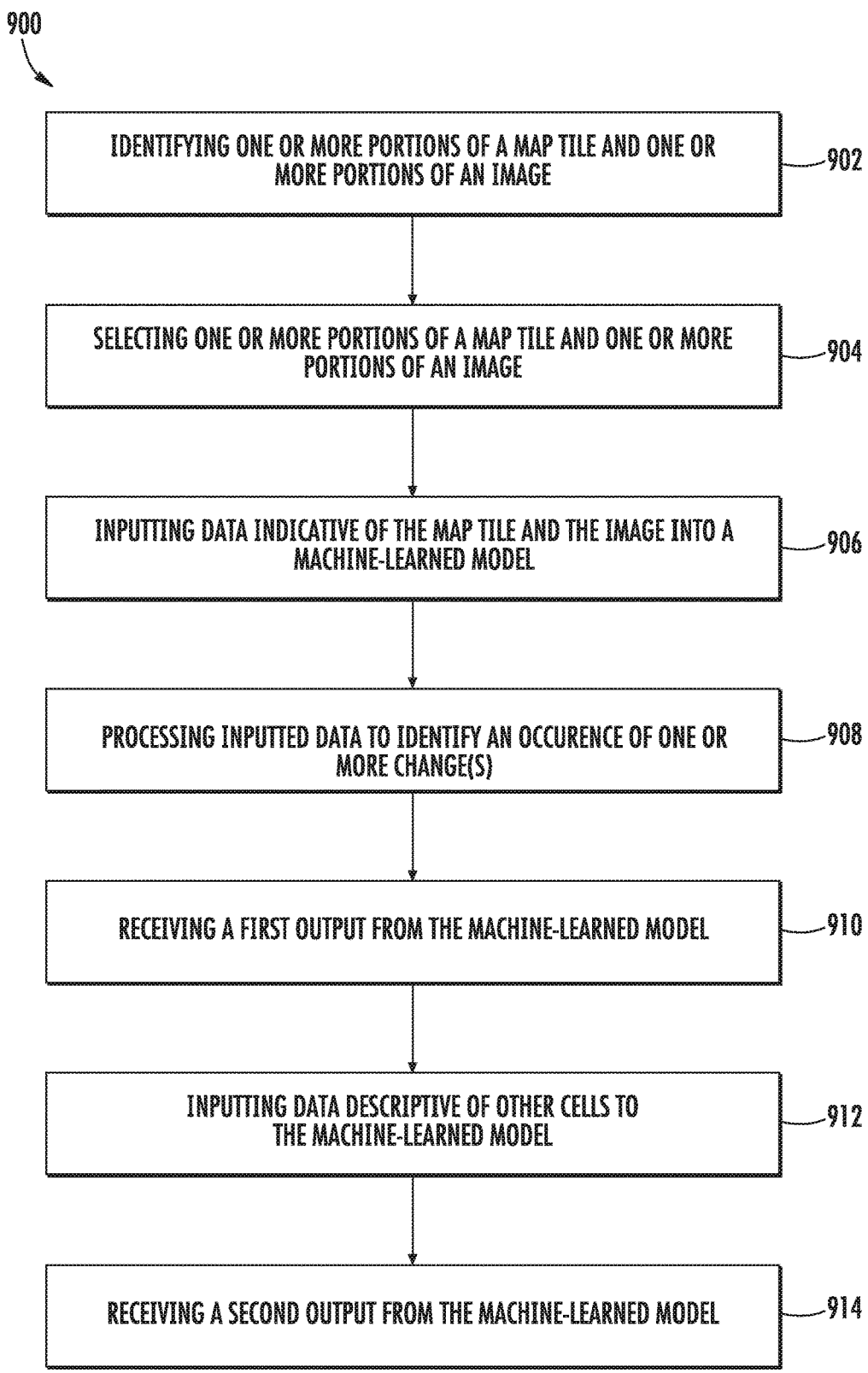
FIG. 9 depicts a flow diagram of an example method according to example embodiments of the present disclosure.

The machine-learned model can identify an occurrence of one or more change(s) associated with the geographic area 204 based, at least in part, on the inputted data 602. For example, FIG. 9 depicts a flow diagram of an example method 900 for analyzing map tiles and images according to example embodiments of the present disclosure. One or more portion(s) of method 900 can be implemented by one or more computing device(s) such as, for example, those shown in FIGS. 1 and 10. Moreover, one or more steps of the method 900 can be combined with the steps of method 800 such as, for example, at (812). FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (902), the method 900 can include identifying one or more portion(s) of the map tile and one or more portion(s) of the image. For instance, the computing device(s) 106 can identify a first plurality of cells 502A associated with the map tile 202, and a second plurality of cells 502B associated with the image 302. Each cell can depict a sub-region (e.g., a land plot) of the larger geographic area 204 (e.g., a neighborhood).

At (904), the method 900 can include selecting one or more portion(s) of the map tile and one or more portion(s) of the image. For instance, the computing device(s) 106 can select a first cell 504A of the first plurality of cells 502A and a second cell 504B of the second plurality of cells 502B. Both the first cell 504A and the second cell 504B can be associated with a sub-region 506 of the geographic area 204.

At (906), the method can include inputting data descriptive of the map tile and the image into a machine-learned model. The computing device(s) 106 can input data 602 descriptive of at least a portion of the map tile 202 and image 302 into a machine-learned model. For instance, the computing device(s) 106 can input data 602 descriptive of portions of each of the map tile 202 and the image 302 into the binary classifier model 126. By way of example, the computing device(s) 106 can input data 602 descriptive of the first cell 504A and the second cell 504B into the machine-learned binary classifier model 126 to identify an occurrence of a change 508 associated with the sub-region 506 of the geographic area 204.

As described herein, the data 602 can include data associated with the sub-region depicted in each of the respective selected portions (e.g., cells) of the map tile 202 and the image 302 such as, for example, data descriptive of the pixels that make up the portions (e.g., cells) and/or the visual characteristics (e.g., color, intensity, depicted objects) associated with such pixels (and/or the cells). In some implementations, the computing device(s) 106 can input data associated with the map tile 202 and the image 302, and the binary classifier model 126 can process the map tile 202 and the image 302 to identify portions (e.g., cells) of the map tile 202 and the image 302 and select portions of the map tile 202 and image 302, as in (902) and (904).

At (908), the method 900 can include processing inputted data to identify an occurrence of one or more change(s) associated with the geographic area. For instance, a machine-learned model can process the data 602 descriptive of the portions of the map tile 202 and the image 302. By way of example, the binary classifier model 126 can process the data descriptive of the first cell 504A and the second cell 504B to identify the occurrence of one or more change(s) associated with the sub-region 506 of the geographic area 204.

As described herein, the binary classifier model 126 can be trained to identify the occurrence of a change (e.g., 508) associated with the sub region 506 of the geographic area 204 based, at least in part, on a comparison of one or more visual characteristic(s) of each of the map tile 202 and the image 302. Thus, the binary classifier model 126 can compare the visual characteristics of the map tile 202 and the image 302 to identify the occurrence of one or more change(s). For example, the binary classifier model 126 can compare the visual characteristics of the first cell 504A (e.g., the pixels associated therewith) and the second cell 504B (e.g., the pixels associated therewith) to identify an occurrence of one or more change(s) (e.g., 508) associated with the sub-region 506 of the geographic area 204.

At (910), the method 900 can include receiving a first output from the machine-learned model. The computing device(s) 106 can receive a first output 604 from the binary classifier model 126. The output 604 can be descriptive of the occurrence of the change 508 associated with the sub-region 506 of the geographic area 204. A change associated with the geographic area 204 can include at least one of a change associated with a structural asset (e.g., building, portion of building, other structure) and a change associated with a transportation asset (e.g., road, travel way). For instance, the change 508 associated with the geographic area 204 can include at least one of building churn (e.g., the addition, removal, change of a building, other structural assets) and/or road churn (e.g., the addition, removal, change of a travel way, other transportation assets). In some implementations, the change can be associated with another type of asset (e.g., agricultural).

At (912), the method 900 can include inputting data descriptive of other cells into the machine-learned model. In some implementations, the computing device(s) 106 can input data descriptive of one or more other portion(s) of the map tile 202 and/or the image 302 into the binary classifier model 126 to detect change. For instance, the computing device(s) 106 can provide data 606 descriptive of other cells of the first and second pluralities of cells 504A-B as another input to the binary classifier model 126 to identify an occurrence of one or more change(s) associated with one or more other sub-regions (e.g., 512) of the geographic area 204. The computing device(s) 106 can receive a second output 608 from the binary classifier model 126. The second output 608 can be descriptive of the occurrence of one or more change(s) associated with one or more of the other sub-region(s) of the geographic area 204.

In some implementations, the computing device(s) 106 can input data descriptive of one or more other map tile(s) and/or image(s) into the binary classifier model 126. The inputted data can be descriptive of one or more portion(s) (e.g., cells) of the other map tile(s) and/or image(s). The binary classifier model 126 can process such data, in a manner similar to that described above, to identify the occurrence of other change(s) associated with the sub-region 506 and/or to identify one or more other change(s) associated with other sub-region(s) of the geographic area 204. The second output 608 (and/or another output) can be descriptive of the occurrence of the one or more change(s) associated with the sub-region 506 and/or another sub-region of the geographic area 204 based, at least in part, on the inputted data from the other map tile(s) and/or image(s).

Returning to FIG. 8, at (814), the method 800 can include determining a level of change associated with the geographic area. In some implementations, the computing device(s) 106 can determine the level of change 516 associated with the geographic area 204 based, at least in part, on the first output 604 and the second output 608, from the binary classifier model 126. The computing device(s) 106 can determine a level of change 516 associated with the geographic area 204 based, at least in part, on the occurrence of the one or more change(s) (e.g., 508, 514) associated with the geographic area 204 (e.g., indicated in the outputs from the model). In some implementations, the computing device(s) 106 can determine the level of change 516 associated with the geographic area 204 (e.g., neighborhood) by aggregating the change occurrences determined for each sub-region (e.g., land plots) and/or applying normalization (e.g., to normalize away the size of the cell), as described herein. Additionally, and/or alternatively, the level of change 516 can be based, at least in part, on change per square distance and/or weighted approaches, as described herein.

In some implementations, the computing device(s) 106 can generate a graphical representation descriptive of the level of change 516 associated with the geographic area 204. The graphical representation can indicate the level of change 516 associated with the geographic area 204 relative to one or more other geographic area(s). This can show the different levels of change occurring in different geographic areas throughout, for example, a country, the world, etc. In some implementations, the graphical representation can indicate which sub-regions of the geographic area 204 (e.g., map tile 202) have experienced change.

At (816), the method 800 can include updating the map interface. For instance, the computing device(s) 106 can update the map interface 200 to reflect the change 508 associated with the geographic area 204 based, at least in part, on the occurrence of the change 508 associated with the geographic area 204. The computing device(s) 106 can also update the map interface 200 to reflect other changes associated with the geographic area 204. In some implementations, the computing device(s) 106 can determine whether the level of change 516 exceeds a threshold level 134 and can update the map interface 200 when the level of change 516 exceeds the threshold level 134. In some implementations, the step (816) of updating the map interface 200 can be carried out subject to the level of importance 122 associated with the geographic area 204 being determined to be above a threshold 136, as described herein.

As described herein, the computing device(s) 106 can update the map interface 200 in a variety of manners. For example, the computing device(s) 106 can provide a control command 130 to a map tile management system 132 to create a new map tile (e.g., 702) to reflect the change (e.g., 508) in the geographic area 204. The map tile management system 132 can receive the control command 130 and take a new of actions to generate and/or update the map tile, as described herein.

In some implementations, the new map tile (e.g., 702) can be based, at least in part, on the image 302 depicting at least the portion of the geographic area 204. For instance, the map tile management system 132 can use the image 302 as a basis (or partial basis) when generating the new tile 702. The computing device(s) 106 can replace the map tile 202 of the map interface with a new map tile (e.g., 702) that reflects the change (e.g., 508) in the geographic area 204, as shown for example in FIG. 7. Additionally, and/or alternatively, the computing device(s) 106 can update the map tile 202 to reflect any identified changes (e.g., 508), as described herein. Accordingly, the computing device(s) 106 can provide an updated map interface 700 for display (e.g., the map interface 200 with one or more new and/or updated map tile(s)), which can more accurately reflect the current condition of the geographic area 204.

At (818), the method 800 can include adjusting image acquisition associated with the geographic area. The computing device(s) 106 can provide a control command 129 to the image acquisition system 104 to adjust an acquisition of imagery data associated with the geographic area 204 based, at least in part, on the level of change 516. For instance, as described herein, the image acquisition system 104 can include one or more image-capturing platform(s) 108A-B. The computing device(s) 106 can provide the control command 129 to the image acquisition system 104 to adjust an acquisition pattern 110A-B associated with the one or more image-capturing platform(s) 108A-B based, at least in part, on the level of change 516. The image acquisition system 104 can receive the control command 129 and can make image acquisition adjustments accordingly. For example, adjusting the acquisition pattern 110A-B can include adjusting a frequency 138A-B with which images of the geographic area 204 are captured by respective ones of the image capturing platform(s) 108A-B. The frequency 138A-B with which images of the geographic area 204 are captured can be increased subject to the determined level of change 516 associated with the geographic area 204 being above a threshold 134. Additionally, and/or alternatively, acquisitions of imagery data can include the adjustment of purchasing strategies and/or solicitations for user submissions.

In some implementations, the computing device(s) 106 can provide the control command 129 to the image acquisition system 104 to adjust the acquisition pattern associated with the one or more image-capturing platform(s) 110A-B based, at least in part, on the level of change 516 and the level of importance 122 associated with the geographic area 204. The image acquisition system 104 can adjust the image acquisition as directed (e.g., via the image-capturing platforms 108A-B). For example, in the event that the level of change 516 is high, and the level of importance 122 is high, the computing device(s) 106 can determine to increase the acquisition of imagery data associated with the geographic area 204 (e.g., by increasing the frequency 138A-B with which images of the geographic area 204 are captured). In the event that the level of change 516 is low, but the level of importance 122 is high, the computing device(s) 106 can determine to maintain and/or decrease the acquisition of imagery data associated with the geographic area 204. The computing device(s) 106 can send the control command 129 (instructing the image acquisition system 104 to make sure adjustments) and the image acquisition system 104 can receive the control command 129 and act accordingly. In this way, the systems and methods of the present disclosure can allocate image and map tile processing resources to capture imagery of areas that are experiencing higher levels of change, while conserving resources that would otherwise be used for areas that are experiencing lower levels of change.

In some implementations, a geographic area with a high level of importance, where change is possible (though not common) can be given a higher priority if the impact of the change would be high. For instance, certain geographic areas (e.g., airports, malls, other popular attractions) have a moderate level of change (e.g., moderate road, building churn) but have a high level of importance (e.g., user device presence) and/or other indictors of interest (e.g., online views of an associated business webpage). Change in such areas could have a significant impact given the location and/or population of such areas. In some implementations, the computing device(s) 106 can assign a priority to these geographic areas (of higher level of importance). Accordingly, the computing device(s) 106 can adjust imagery acquisition (e.g., via one or more control command(s) to the image acquisition system 104) such that the images of these high priority areas are regularly captured, allowing the computing device(s) to regularly monitor change in these areas where change (although not common) may have a significant impact.

Figure 10:
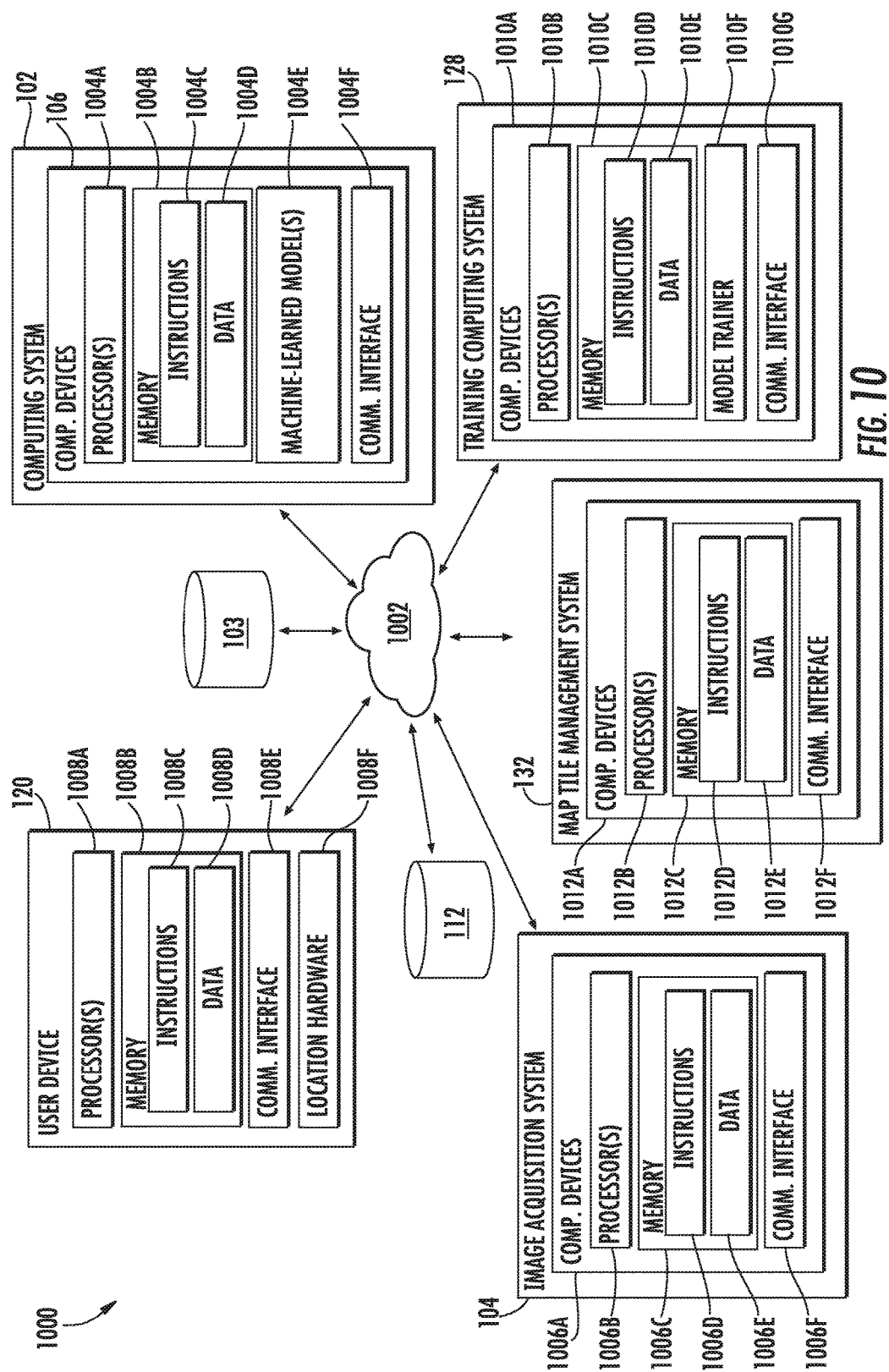
FIG. 10 depicts an example system according to example embodiments of the present disclosure.

FIG. 10 depicts an example system 1000 according to example embodiments of the present disclosure. The system 1000 can include the machine learning computing system 102, the map database 103, the image acquisition system 104, the image database 112, the plurality of user devices 120, the training computing system 128, and/or the map tile management system 132. The components of system 1000 can communicate with one or more of the other component(s) of system 1000 via one or more communication network(s) 1002 to, for example, exchange data.

The computing system 102 includes one or more computing device(s) 106. The computing device(s) 106 can include one or more processor(s) 1004A and one or more memory device(s) 1004B. The one or more processor(s) 1004A can be any suitable processing device (e.g., a processor core, a microprocessor, an ASIC, a FPGA, a controller, a microcontroller, etc.) and can be one processor or a plurality of processors that are operatively connected. The memory device(s) 1004B can include one or more non-transitory computer-readable storage medium(s), such as RAM, ROM, EEPROM, EPROM, flash memory devices, magnetic disks, etc., and/or combinations thereof.

The one or more memory device(s) 1004B can store information accessible by the one or more processor(s) 1004A, including computer-readable instructions 1004C that can be executed by the one or more processor(s) 1004A. The instructions 1004C can be any set of instructions that when executed by the one or more processor(s) 1004A, cause the one or more processor(s) 1004A to perform operations. In some embodiments, the instructions 1004C can be executed by the one or more processor(s) 1004A to cause the one or more processor(s) 1004A to perform operations, such as any of the operations and functions for which the computing system 102 and/or the computing device(s) 106 are configured, the operations for updating a map interface, and/or any other operations or functions, as described herein. The memory device(s) 1004B (e.g., a non-transitory computer readable storage medium) can include computer executable instructions 1004C that when executed by the one or more computer processor(s) 1004A will cause the processor(s) 1004 to carry out a method (e.g., method 800, 900). For instance, the instructions 1004C can cause the processor(s) 1004A to obtain data descriptive of a map tile of a map interface that is displayable on a display device, obtain data descriptive of an image depicting at least a portion of the geographic area, analyze the data descriptive of the map tile and the data descriptive of the image to determine an occurrence of a change associated with the geographic area, and update the map interface to reflect the change associated with the geographic area based at least in part on the occurrence of the change associated with the geographic area, as described herein. The instructions 1004C can be software written in any suitable programming language or can be implemented in hardware. Additionally, and/or alternatively, the instructions 1004C can be executed in logically and/or virtually separate threads on processor(s) 1004A.

The one or more memory device(s) 1004B can also store data 1004D that can be retrieved, manipulated, created, or stored by the one or more processor(s) 1004A. The data 1004D can include, for instance, data associated with map tiles, data associated with images, data associated with a geographic area, location data, data associated with a machine-learned model, training data, and/or other data or information. The data 1004D can be stored in one or more database(s). The one or more database(s) can be connected to the computing device(s) 106 by a high bandwidth LAN or WAN, or can also be connected to computing device(s) 106 through the network(s) 1002. The one or more database(s) can be split up so that they are located in multiple locales.

As described herein, the computing device(s) 106 can store or otherwise include one or more machine-learned model(s) 1004E such as, for example, the binary classifier model 126. The machine-learned model(s) 1004E can be or can otherwise include various machine-learned models such as neural networks (e.g., deep neural networks) or other multi-layer non-linear models. The model(s) 1004E can be accessed by the processor(s) 1004A to perform the operations and functions for updating a map interface, as described herein.

The computing device(s) 106 can also include a network interface 1004F used to communicate with one or more other component(s) of the system 1000 (e.g., image acquisition system 104, user device(s) 120, training computing system 128, map tile management system 132, databases 103, 112) over the network(s) 1002. The network interface 1004F can include any suitable components for interfacing with one or more network(s), including for example, transmitters, receivers, ports, controllers, antennas, or other suitable components.

In some implementations, the machine learning computing system 102 can include or is otherwise implemented by one or more server computing device(s). In instances in which the machine learning computing system 102 includes plural server computing devices, such server computing devices can operate according to sequential computing architectures, parallel computing architectures, or some combination thereof.

The image acquisition system 104 can include one or more computing device(s) 1006A. The computing device(s) 1006A can include one or more processor(s) 1006B and one or more memory device(s) 1006C. The one or more processor(s) 1006B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 1006C can include one or more non-transitory computer-readable storage medium(s), such as RAM, ROM, EEPROM, EPROM, flash memory devices, magnetic disks, etc., and/or combinations thereof.

The memory device(s) 1006C can include one or more computer-readable media and can store information accessible by the one or more processor(s) 1006B, including instructions 1006D that can be executed by the one or more processor(s) 1006B. For instance, the memory 1006C can store instructions 1006D for acquiring imagery data, as described herein. In some embodiments, the instructions 1006D can be executed by the one or more processor(s) 1006B to cause the one or more processor(s) 1006B to perform operations, such as any of the operations and functions for which the image acquisition system 104 is configured (e.g., providing image data, adjusting acquisition of imagery, communicating with image-capturing platforms) and/or any other operations or functions of the image acquisition system 104, as described herein. The instructions 1006D can be software written in any suitable programming language or can be implemented in hardware. Additionally, and/or alternatively, the instructions 1006D can be executed in logically and/or virtually separate threads on processor(s) 1006B.

The one or more memory device(s) 1006C can also store data 1006E that can be retrieved, manipulated, created, or stored by the one or more processors 1006B. The data 1006E can include, for instance, image data associated with one or more geographic areas, acquisition patterns, etc. In some implementations, the database 112 can be included or otherwise associated with the image acquisition system 104. In some implementations, the data 1006E can be received from another device (e.g., a remote accessible image database).

The computing device(s) 1006A can also include a network interface 1006F used to communicate with one or more other component(s) of the system 1000 (e.g., computing system 102, database 112) over the network(s) 1002. The network interface 1006F can include any suitable components for interfacing with one or more network(s), including for example, transmitters, receivers, ports, controllers, antennas, or other suitable components.

Each of the user devices 120 can be any suitable type of computing device, such as a laptop, desktop, other personal computing device, navigation system, smartphone, tablet, wearable computing device, other mobile computing device, a display with one or more processor(s), server computing device, or any other type of computing device. A user device 120 can include one or more processor(s) 1008A and one or more memory device(s) 1008B. The one or more processor(s) 1008A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 1008B can include one or more non-transitory computer-readable storage medium(s), such as RAM, ROM, EEPROM, EPROM, flash memory devices, magnetic disks, etc., and/or combinations thereof.

The memory device(s) 1008B can include one or more computer-readable media and can store information accessible by the one or more processor(s) 1008A, including instructions 1008C that can be executed by the one or more processor(s) 1008A. For instance, the memory device(s) 1008B can store instructions 1008C for determining device location and providing location data to the computing system 102, as described herein. In some embodiments, the instructions 1008C can be executed by the one or more processor(s) 1008A to cause the one or more processor(s) 1008A to perform operations, such as any of the operations and functions for which the user device(s) 120 are configured, and/or any other operations or functions of the user device(s) 120, as described herein. The instructions 1008C can be software written in any suitable programming language or can be implemented in hardware. Additionally, and/or alternatively, the instructions 1008C can be executed in logically and/or virtually separate threads on processor(s) 1008A.

The one or more memory device(s) 1008B can also store data 1008D that can be retrieved, manipulated, created, or stored by the one or more processor(s) 1008A. The data 1008D can include, for instance, data associated with the user device (e.g., location data). In some implementations, the data 1008D can be received from another device (e.g., a remote computing system for determining location).

A user device 120 can include various location computing hardware 1008F for determining the location of a user device. For instance, the location hardware 1008F can include sensors, GPS computing devices, etc. that can allow a user device 120 to determine its location. In some implementations, the location computing hardware 1008F can be used in conjunction with data received from one or more other remote computing device(s) to determine the location of the user device 120. In some implementations, the user device 120 can include a display device (e.g., 201) for displaying a map interface (e.g., 200) received for the computing device(s) 106.

A user device 120 can also include a network interface 1008F used to communicate with one or more other component(s) of system 1000 (e.g., computing system 102) over the network(s) 1002. The network interface 1008F can include any suitable components for interfacing with one or more network(s), including for example, transmitters, receivers, ports, controllers, antennas, or other suitable components.

In some implementations, the system 1000 can further include a training computing system 128 communicatively coupled over the network(s) 1002. The training computing system 128 can be separate from the machine learning computing system 102 or can be a portion of the machine learning computing system 102. The training computing system 128 can include one or more computing device(s) 1010A.

The computing device(s) 1010A can include one or more processor(s) 1010B and one or more memory device(s) 1010C. The one or more processor(s) 1010B can include any suitable processing device, such as a microprocessor, controller, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 1010C can include one or more non-transitory computer-readable storage medium(s), such as RAM, ROM, EEPROM, EPROM, flash memory devices, magnetic disks, etc., and/or combinations thereof.

The memory device(s) 1010C can include one or more computer-readable media and can store information accessible by the one or more processor(s) 1010B, including instructions 1010D that can be executed by the one or more processor(s) 1010B. For instance, the memory 1010C can store instructions 1010D for training machine-learned models, as described herein. In some embodiments, the instructions 1010D can be executed by the one or more processor(s) 1010B to cause the one or more processor(s) 1010B to perform operations, such as any of the operations and functions for which the training computing system 128 is configured (e.g., training the binary classifier model) and/or any other operations or functions of training computing system 128, as described herein. The instructions 1010D can be software written in any suitable programming language or can be implemented in hardware. Additionally, and/or alternatively, the instructions 1010D can be executed in logically and/or virtually separate threads on processor(s) 1010B.

The one or more memory device(s) 1010C can also store data 1010E that can be retrieved, manipulated, created, or stored by the one or more processor(s) 1010B. The data 1010E can include, for instance, training data, etc. In some implementations, the data 1010E can be received from another device (e.g., a remote accessible image database).

The computing device(s) 1010A can also include one or more model trainer(s) 1010F such as, for example, model trainer 402. The model trainer(s) 1010F can include computer logic utilized to provide desired functionality. The model trainer(s) 1010F can be implemented in hardware, firmware, and/or software controlling a general purpose processor. For example, in some implementations, the model trainer(s) 1010F can include program files stored on a storage device, loaded into a memory and executed by one or more processors (e.g., 1010B). In other implementations, the model trainer(s) 1010F can include one or more set(s) of computer-executable instructions that are stored in a tangible computer-readable storage medium such as RAM hard disk or optical or magnetic media.

The computing device(s) 1010A can also include a network interface 1010G used to communicate with one or more other component(s) of the system 1000 (e.g., computing system 102) over the network(s) 1002. The network interface 1010G can include any suitable components for interfacing with one or more network(s), including for example, transmitters, receivers, ports, controllers, antennas, or other suitable components.

The map tile management system 132 can include one or more computing device(s) 1012A. The computing device(s) 1012A can include one or more processor(s) 1012B and one or more memory device(s) 1012C. The one or more processor(s) 1012B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s)

1012C can include one or more non-transitory computer-readable storage medium(s), such as RAM, ROM, EEPROM, EPROM, flash memory devices, magnetic disks, etc., and/or combinations thereof.

The memory device(s) 1012C can include one or more computer-readable media and can store information accessible by the one or more processor(s) 1012B, including instructions 1012D that can be executed by the one or more processor(s) 1012B. For instance, the memory 1012C can store instructions 1012D for generating and updating map tiles, as described herein. In some embodiments, the instructions 1012D can be executed by the one or more processor(s) 1012B to cause the one or more processor(s) 1012B to perform operations, such as any of the operations and functions for which the map tile management system 132 is configured (e.g., generating new map tiles, updating map tiles) and/or any other operations or functions of the map tile management system 132, as described herein. The instructions 1012D can be software written in any suitable programming language or can be implemented in hardware. Additionally, and/or alternatively, the instructions 1012D can be executed in logically and/or virtually separate threads on processor(s) 1012B.

The one or more memory device(s) 1012C can also store data 1012E that can be retrieved, manipulated, created, or stored by the one or more processor(s) 1012B. The data 1012E can include, for instance, data associated with one or more map tile(s), etc. In some implementations, the database 103 can be included or otherwise associated with the map tile management system 132. In some implementations, the data 1012E can be received from another device (e.g., a remote accessible image database).

The computing device(s) 1012A can also include a network interface 1012F used to communicate with one or more other component(s) of the system 1000 (e.g., computing system 102, database 103) over the network(s) 1002. The network interface 1012F can include any suitable components for interfacing with one or more network(s), including for example, transmitters, receivers, ports, controllers, antennas, or other suitable components.

The network(s) 1002 can be any type of communications network, such as a local area network (e.g. intranet), wide area network (e.g. Internet), cellular network, or some combination thereof and can include any number of wired or wireless links. The network(s) 1002 can also include a direct connection between one or more component(s) of the system 1000. In general, communication over the network(s) 1002 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of updating a map interface for display on a display device, the map interface including a plurality of map tiles, each map tile associated with a portion of a geographic area depicted by the map interface, the method comprising:

obtaining, by one or more computing devices, data descriptive of a map tile of the map interface, wherein the map tile presents imagery associated with a portion of the geographic area;

obtaining, by the one or more computing devices, data descriptive of an image depicting at least the respective portion of the geographic area associated with the map tile, wherein the image is acquired by an image acquisition system;

analyzing, by the one or more computing devices, the data descriptive of the map tile and the data descriptive of the image to determine an occurrence of a change associated with the portion of geographic area, wherein the step of analyzing further comprises (a) analyzing at least one of a first plurality of cells of the map tile, each representing a sub-region of the respective portion of the geographic area, and at least a corresponding one of a second plurality of cells of the image, each corresponding to a respective sub-region represented by the first plurality of cells, (b) detecting an occurrence of a change associated with one or more of a structural asset, a transportation asset, an environmental asset, or an agricultural asset associated with one or more sub-regions of the portion of the geographic area based at least in part on the analysis in step (a), and (c) identifying a level of change associated with the portion of the geographic area based at least in part on the detection in step (b);

based at least in part on the identified level of change, updating, by the one or more computing devices, the map tile of the map interface to reflect the change associated with the portion of the geographic area; and providing for display on the display device an updated map interface including the updated map tile.

2. The computer-implemented method of claim 1, wherein analyzing, by the one or more computing devices, the data descriptive of the map tile and the data descriptive of the image to determine the occurrence of the change associated with the portion of the geographic area comprises:

inputting, by the one or more computing devices, data descriptive of the at least one of the first plurality of cells and the at least one of the second plurality of cells into a machine-learned binary classifier model to detect the occurrence of the change associated with the one or more sub-regions of the portion of the geographic area; and receiving, by the one or more computing devices, a first output from the binary classifier model, the output descriptive of the occurrence of the change associated with the one or more sub-regions of the portion of the geographic area.

3. The computer-implemented method of claim 2, wherein analyzing, by the one or more computing devices, the data descriptive of the map tile and the data descriptive of the image to determine the occurrence of the change associated with the portion of the geographic area further comprises:

providing, by the one or more computing devices, data descriptive of other cells of the first and second pluralities of cells as another input to the binary classifier model to identify an occurrence of one or more changes associated with one or more other sub-regions of the geographic area;

receiving, by the one or more computing devices, a second output from the binary classifier model, the second output descriptive of the occurrence of one or more changes associated with one or more of the other sub-regions of the geographic area; and determining, by the one or more computing devices, a level of change associated with the geographic area based at least in part on the first and second outputs.

4. The computer-implemented method of claim 1, wherein updating, by the one or more computing devices, the map tile of the map interface comprises:

determining, by the one or more computing devices, whether the level of change exceeds a threshold level; and updating, by the one or more computing devices, the map interface when the level of change exceeds the threshold level.

5. The computer-implemented method of claim 4, further comprising:

providing, by the one or more computing devices, a control command to the image acquisition system to adjust an acquisition of imagery data associated with the respective portion of the geographic area based at least in part on the level of change.

6. The computer-implemented method of claim 1, wherein updating, by the one or more computing devices, the map tile of the map interface comprises:

providing, by the one or more computing devices, a control command to a map tile management system to create a new map tile to reflect the change associated with the portion of the geographic area.

7. The computer-implemented method of claim 1, wherein updating, by the one or more computing devices, the map tile of the map interface comprises:

replacing, by the one or more computing devices, the map tile of the map interface with a new map tile that reflects the change associated with the portion of the geographic area.

8. The computer-implemented method of claim 7, wherein the new map tile is based at least in part on the image depicting at least the portion of the geographic area.

9. The computer-implemented method of claim 1, further comprising:

obtaining, by the one or more computing devices, location data associated with a plurality of user devices, the location data descriptive of a number of user devices located at the portion of the geographic area; and determining, by the one or more computing devices, a level of importance associated with the geographic area based at least in part on the number of user devices located at the portion of the geographic area.

10. The computer-implemented method of claim 9, further comprising:

identifying, by the one or more computing devices, the map tile based at least in part on the level of importance associated with the portion of the geographic area.

11. The computer-implemented method of claim 9, wherein the step of updating the map tile of the map interface is carried out subject to the level of importance associated with the portion of the geographic area being determined to be above a threshold.

12. A non-transitory computer readable storage medium comprising computer executable instructions that when executed by one or more computer processors will cause the processors to:

obtain data descriptive of a map tile of the map interface, wherein the map tile presents imagery associated with a portion of the geographic area;

obtain data descriptive of an image depicting at least the respective portion of the geographic area associated with the map tile, wherein the image is acquired by an image acquisition system;

analyze the data descriptive of the map tile and the data descriptive of the image to determine an occurrence of a change associated with the portion of geographic area, wherein to analyze the data descriptive of the map tile and the data descriptive of the image to determine the occurrence of the change associated with the portion of geographic area, the processors are caused to (a) analyze at least one of a first plurality of cells of the map tile, each representing a sub-region of the respective portion of the geographic area, and at least a corresponding one of a second plurality of cells of the image, each corresponding to a respective sub-region represented by the first plurality of cells, (b) detect an occurrence of a change associated with one or more sub-regions of the portion of the geographic area based at least in part on the analysis in step (a), and (c) identify a level of change associated with one or more of a structural asset, a transportation asset, an environmental asset, or an agricultural asset associated with the portion of the geographic area based at least in part on the detection in step (b);

based at least in part on the identified level of change, update the map tile of the map interface to reflect the change associated with the portion of the geographic area; and provide for display on the display device an updated map interface including the updated map tile.

13. A computer system for updating a map interface comprising:

at least one processor; and at least one tangible, non-transitory computer-readable medium that stores instructions that, when executed by the at least one processor, cause the computing system to perform operations comprising:

obtaining data descriptive of a map tile of the map interface, wherein the map tile presents imagery associated with a portion of the geographic area;

obtaining data descriptive of an image depicting at least the respective portion of the geographic area associated with the map tile, wherein the image is acquired by an image acquisition system;

analyzing the data descriptive of the map tile and the data descriptive of the image to determine an occurrence of a change associated with the portion of geographic area, wherein the step of analyzing further comprises
  (a) analyzing at least one of a first plurality of cells of the map tile, each representing a sub-region of the respective portion of the geographic area, and at least a corresponding one of a second plurality of cells of the image, each corresponding to a respective sub-region represented by the first plurality of cells,
  (b) detecting an occurrence of change in one or more sub-regions of the portion of the geographic area based at least in part on the analysis in step (a), and
  (c) identifying a level of a change associated with one or more of a structural asset, a transportation asset, an environmental asset, or an agricultural asset associated with the portion of the geographic area based at least in part on the detection in step (b);
based at least in part on the identified level of change, updating the map tile of the map interface to reflect the change associated with the portion of the geographic area; and
providing for display on the display device an updated map interface including the updated map tile.

14. The computer system of claim 13, wherein analyzing, by the one or more computing devices, the data descriptive of the map tile and the data descriptive of the image to determine the occurrence of the change associated with the portion of the geographic area comprises:
  inputting data descriptive of the at least one of the first plurality of cells and the at least one of the second plurality of cells into a machine-learned binary classifier model to detect the occurrence of the change associated with the one or more sub-regions of the portion of the geographic area; and
  receiving a first output from the binary classifier model, the output descriptive of the occurrence of the change associated with the sub-regions of the portion of the geographic area.

15. The computer system of claim 13, wherein updating the map tile of the map interface comprises:
  determining whether the level of change exceeds a threshold level; and
  updating the map interface when the level of change exceeds the threshold level.

16. The computer system of claim 13, wherein updating the map tile of the map interface comprises:
  providing a control command to a map tile management system to create a new map tile to reflect the change in the geographic area.

17. The computer system of claim 13, wherein updating the map tile of the map interface comprises:
  replacing the map tile of the map interface with a new map tile that reflects the change associated with the portion of the geographic area.

18. The computer system of claim 13, wherein the operations further comprise:
  obtaining location data associated with a plurality of user devices, the location data descriptive of a number of user devices located at the portion of the geographic area; and
  determining a level of importance associated with the geographic area based at least in part on the number of user devices located at the portion of the geographic area.

19. The computer system of claim 18, wherein the operations further comprise:
  identifying the map tile based at least in part on the level of importance associated with the portion of the geographic area.

* * * * *